United States Patent
Ikeuchi

(10) Patent No.: US 7,200,343 B2
(45) Date of Patent: Apr. 3, 2007

(54) DRIVE CONTROL APPARATUS AND DRIVE CONTROL METHOD FOR OPTICAL MODULATOR

(75) Inventor: Tadashi Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 10/284,401

(22) Filed: Oct. 31, 2002

(65) Prior Publication Data

US 2003/0185575 A1 Oct. 2, 2003

(30) Foreign Application Priority Data

Mar. 26, 2002 (JP) ............................. 2002-086673

(51) Int. Cl.
*H04B 10/04* (2006.01)
*H04B 10/12* (2006.01)
*G02B 26/00* (2006.01)

(52) U.S. Cl. .............. 398/198; 398/197; 398/183; 398/186; 359/239

(58) Field of Classification Search .......... 372/26, 372/29, 29.001, 29.01–29.023; 398/198, 398/197, 183–191; 359/239, 237, 238
See application file for complete search history.

(56) References Cited

U.S. PATENT DOCUMENTS

| | | | | |
|---|---|---|---|---|
| 5,003,624 A | * | 3/1991 | Terbrack et al. | 398/198 |
| 5,161,044 A | * | 11/1992 | Nazarathy et al. | 398/194 |
| 5,170,274 A | * | 12/1992 | Kuwata et al. | 398/198 |
| 5,321,543 A | * | 6/1994 | Huber | 398/194 |
| 5,323,406 A | * | 6/1994 | Yee et al. | 372/26 |
| 5,327,279 A | * | 7/1994 | Farina et al. | 398/147 |
| 5,343,324 A | * | 8/1994 | Le et al. | 398/198 |
| 5,359,449 A | * | 10/1994 | Nishimoto et al. | 398/198 |
| 5,373,389 A | * | 12/1994 | Huber | 398/194 |
| 5,440,113 A | * | 8/1995 | Morin et al. | 250/205 |
| 5,488,503 A | * | 1/1996 | Schaffner et al. | 359/245 |
| 5,513,030 A | * | 4/1996 | Epworth | 398/198 |
| 5,515,199 A | * | 5/1996 | Farina | 359/326 |
| 5,532,857 A | * | 7/1996 | Gertel et al. | 398/198 |
| 5,644,665 A | * | 7/1997 | Burns et al. | 385/3 |
| 5,699,179 A | * | 12/1997 | Gopalakrishnan | 398/194 |
| 5,710,653 A | * | 1/1998 | Nemecek et al. | 398/194 |
| 5,812,297 A | * | 9/1998 | Mussino et al. | 398/198 |
| RE36,088 E | * | 2/1999 | Kuwata et al. | 398/198 |

(Continued)

FOREIGN PATENT DOCUMENTS

JP 03-251815 11/1991

(Continued)

*Primary Examiner*—M. R. Sedighian
(74) *Attorney, Agent, or Firm*—Staas & Halsey LLP

(57) ABSTRACT

The present invention aims at providing a drive control apparatus and a drive control method with a simple configuration, which can also reliably compensate for operating point fluctuations of an optical modulator driven in accordance with a drive signal corresponding to a clock signal. To this end, the drive control apparatus of the present invention is configured to supply, to an optical modulator of which the optical output characteristics with respect to drive voltage are changed periodically, a drive signal having a waveform corresponding to a clock signal, and the amplitude of which is set to around $2V\pi$, detect the power of an optical signal output from the optical modulator, and control an operating point of the optical modulator so that an average value of the optical signal power becomes a maximum.

26 Claims, 21 Drawing Sheets

U.S. PATENT DOCUMENTS

| | | | |
|---|---|---|---|
| 5,875,048 A * | 2/1999 | Nemecek et al. | 398/194 |
| 5,917,637 A * | 6/1999 | Ishikawa et al. | 398/197 |
| 5,963,567 A * | 10/1999 | Veselka et al. | 372/21 |
| 5,973,816 A * | 10/1999 | Akiyama et al. | 359/237 |
| 5,987,050 A * | 11/1999 | Doerr et al. | 372/108 |
| 6,014,390 A * | 1/2000 | Joyner | 372/20 |
| 6,091,535 A * | 7/2000 | Satoh | 359/239 |
| 6,122,414 A * | 9/2000 | Shimizu | 385/2 |
| 6,163,395 A * | 12/2000 | Nemecek et al. | 398/198 |
| 6,198,560 B1 * | 3/2001 | Claringburn et al. | 398/198 |
| 6,240,118 B1 * | 5/2001 | Doerr et al. | 372/64 |
| 6,262,828 B1 * | 7/2001 | Akiyama et al. | 359/237 |
| 6,278,539 B1 * | 8/2001 | Ooi et al. | 359/237 |
| 6,317,247 B1 * | 11/2001 | Yang et al. | 359/245 |
| 6,320,692 B1 * | 11/2001 | Notargiacomo | 359/245 |
| 6,341,031 B1 * | 1/2002 | McBrien et al. | 359/237 |
| 6,362,913 B2 * | 3/2002 | Ooi et al. | 359/245 |
| 6,392,779 B1 * | 5/2002 | Iannelli et al. | 359/245 |
| 6,407,846 B1 * | 6/2002 | Myers et al. | 359/239 |
| 6,539,038 B1 * | 3/2003 | Wilkerson et al. | 372/38.02 |
| 6,552,838 B2 * | 4/2003 | Ransijn et al. | 359/245 |
| 6,567,203 B1 * | 5/2003 | Hill et al. | 359/254 |
| 6,590,691 B1 * | 7/2003 | Nagra et al. | 359/237 |
| 6,621,945 B2 * | 9/2003 | Bissessur | 385/2 |
| 6,687,451 B1 * | 2/2004 | Sikora | 398/187 |
| 6,738,174 B1 * | 5/2004 | Hill et al. | 359/245 |
| 6,813,056 B2 * | 11/2004 | Cottrell et al. | 359/280 |
| 6,836,622 B2 * | 12/2004 | Kobayashi et al. | 398/198 |
| 6,839,363 B2 * | 1/2005 | Lin et al. | 372/18 |
| 6,842,587 B1 * | 1/2005 | McGhan et al. | 398/201 |
| 6,900,707 B2 * | 5/2005 | Erlig et al. | 333/156 |
| 6,951,120 B2 * | 10/2005 | McCaughan et al. | 65/392 |
| 6,980,746 B2 * | 12/2005 | Hayee | 398/183 |
| 2001/0017724 A1 | 8/2001 | Miyamoto et al. | 359/158 |
| 2001/0046272 A1 * | 11/2001 | Miyano | 375/375 |
| 2002/0109897 A1 * | 8/2002 | Mirshekar-Syahkal et al. | 359/245 |
| 2002/0131140 A1 * | 9/2002 | Myers et al. | 359/239 |
| 2002/0141027 A1 * | 10/2002 | LaGasse et al. | 359/237 |
| 2002/0176452 A1 * | 11/2002 | Lin et al. | 372/18 |
| 2003/0112487 A1 * | 6/2003 | Fuller et al. | 359/239 |
| 2003/0169470 A1 * | 9/2003 | Alagar et al. | 359/110 |
| 2003/0185575 A1 * | 10/2003 | Ikeuchi | 398/197 |
| 2005/0238368 A1 * | 10/2005 | Ikeuchi et al. | 398/198 |

FOREIGN PATENT DOCUMENTS

| | | |
|---|---|---|
| JP | 2000-162563 | 6/2000 |
| JP | 2001-119344 | 4/2001 |

* cited by examiner

AVERAGE VALUE OF OPTICAL OUTPUT POWER $Pa_{MAX}$ $-V\pi$    0    $V\pi$

OPERATING POINT DEVIATION

DRIVE CONTROL APPARATUS AND DRIVE CONTROL METHOD FOR OPTICAL MODULATOR

BACKGROUND OF THE INVENTION

1. Field of the Invention

The present invention relates to a drive control technique for an optical modulator used in optical communication. In particular, the invention relates to a drive control apparatus and drive control method, which can stably control the drive of an optical modulator used in ultra high speed optical transmission and the like.

2. Description of the Related Art

Recently, in optical transmission systems, with the progress of wavelength division multiplexing (WDM) technology and higher transmission speed per wavelength, systems enabling of large capacity optical transmission are being realized. Also, for the modulation code form for transmission used in such systems, in order to enlarge the transmission capacity and transmission distance, forms such as optical duo binary code and carrier suppressed RZ (CS-RZ) code have been proposed, instead of conventional NRZ (non return to zero) code or RZ (return to zero) code (refer to Japanese Unexamined Patent Publication No. 2001-119344). In particular, the CS-RZ code is said to be the most promising modulation code form for the next generation, since it enables enlargement of transmission distance and transmission capacity by a simple method.

Also, in optical modulation for ultra high speed transmission, in order to suppress wavelength fluctuations (chirping) during modulation, an external modulation method has been used, for allowing a semiconductor laser to continuously emit light, to switch the light on and off by an external modulator. For the external modulator, a Mach-Zehnder optical modulator (to be referred to as MZ modulator hereunder) is prevailing.

FIG. 31 shows an example of optical output characteristics of an MZ optical modulator with respect to a drive signal. In the conventional NRZ modulation method, on/off modulation of the optical output is performed by matching a high level and a low level of a drive signal, whose level fluctuates at a period $T_0$, with an apex A of optical emission and an apex B of optical extinction in the optical output characteristics. In the following explanation, a difference of bias voltages corresponding to the apexes A and B of emission/extinction in the optical output characteristics which fluctuate periodically is represented by $V\pi$. According to this, an amplitude of the drive signal in the NRZ modulation method described above becomes $V\pi$.

For the MZ optical modulator as described above, the advantage is less chirping. However, there is a problem in that the optical output characteristics with respect to the drive signal drift timewise due to temperature change and a change with time, resulting in that interference between the codes occurs in the on/off level of the optical output. In order to solve this problem to stably control an operating point of the MZ optical modulator, a control at the operating point is necessary, such that, as shown in FIG. 31, in the case where a curve "a" showing the optical output characteristics with respect to the drive voltage moves to the left to become a curve "b", a bias voltage by the drive signal is made lower according to the such a change, and in the case where the curve "a" moves to the right to become a curve "c", the bias voltage is made higher according to such a change. In the conventional modulation method using the NRZ code or the RZ code, a compensation technique has been proposed in Japanese Patent Publication No. 3-251815, for superimposing a low frequency signal onto the drive signal to detect an fluctuation amount and a fluctuation direction of the operating point, and then controlling the bias voltage by feedback to hold the operating point normal.

Under the background as described above, also for the new modulation methods such as the optical duo binary modulation method and the CS-RZ modulation method and the like, an operating point control technique for the MZ optical modulator which can correspond to these modulation methods is required.

As an operating point control technique for an MZ optical modulator corresponding to the CS-RZ modulation method, there is the one disclosed in Japanese Unexamined Patent Publication No. 2001-119344. In this conventional technique, as shown in FIG. 32, a transmission section of the CS-RZ modulation method comprises: a transmission light source 110 that generates continuous light; an MZ optical modulator 120 on a data modulation side, that is driven in accordance with a drive signal obtained by adjusting, by a drive circuit 121, a data signal corresponding to the NRZ modulation method so that the amplitude thereof becomes $V\pi$, and an MZ optical modulator 130 on a clock modulation side, that is driven in accordance with a drive signal obtained by adjusting, by a drive circuit 131, a clock signal having a frequency of ½ the bit rate of the data signal so that the amplitude thereof becomes $2V\pi$.

In such a transmission section of the CS-RZ modulation method, by adjusting a crossing point in an output from the optical modulator 120 on the data modulation side, to an optical extinction phase of the optical modulator 130 on the clock modulation side, an optical signal having the same waveform as for when the RZ code is used is output as an optical output. Therefore, for the optical modulator 120 on the data modulation side, since the drive signal of the NRZ code form with amplitude $V\pi$ is used in the same manner as for the aforementioned case shown in FIG. 31, the operating point can be optimized by applying the conventional operating point control method. On the other hand, for the optical modulator 130 on the clock modulation side, for example as shown in FIG. 33, since the waveform of the drive signal is a sine wave with amplitude $2V\pi$, it becomes necessary to control the operating point so that the amplitude of the drive signal at the time of optical extinction becomes zero.

In addition, for the operating point control method of the MZ optical modulator corresponding to the optical duo binary modulation method, the technique disclosed in Japanese Unexamined Patent Publication No. 2000-162563 is known. In this conventional technique, for example as shown in FIG. 34, different to the case of the modulation method using the NRZ code or the RZ code, a drive signal corresponding to the optical duo binary code, being a differential code with amplitude $2V\pi$, is supplied to an MZ optical modulator 210. This drive signal is superimposed with an operating point control signal of low frequency generated by an oscillator 212. A part of the optical output from the MZ optical modulator 210 is branched by an optical coupler 220, and then sent to a phase comparator 223 via an optical receiver 221 and an I/V converter 222. In the phase comparator 223, a phase comparison is performed on the superimposed component contained in the optical output, and the operating point control signal, to thereby detect the fluctuation amount and the fluctuation direction of the operating point. Then, the operating point is optimized by feeding back the result of the phase comparison to a control of a bias supply circuit 225. Furthermore, in the conventional technique described above, for example as shown in FIG. 35, a compensation method has also been proposed, for performing a control such that the frequency of the superimposed component contained in the optical output becomes a maximum, by utilizing the phenomenon where the frequency of the superimposed component becomes twice the frequency of the operating point control signal when the bias voltage coincides with the operating point, to hold the operating point normal.

Considering the control of the operating point of the MZ optical modulator on the clock modulation side in the CS-RZ modulation method by applying the conventional operating point control technique as described above, even if an operating point control signal with a low frequency is superimposed on the clock signal, since the waveform of the clock signal is a sine wave, the optical output from the optical modulator only becomes a "1" level (apex A of optical emission) temporally, and there is no point where a "1" level is continuous for the optical output, as in the case where an operating point control signal is superimposed on a rectangular wave data signal. Therefore, the superimposed component with a low frequency corresponding to the operating point control signal rarely appears in the optical output from the optical modulator. Consequently, in the conventional method of superimposing the operating point control signal, it is difficult to detect the fluctuation amount and the fluctuation direction of the operating point in the MZ optical modulator on the clock modulation side.

Also, in the method which controls the operating point by detecting that the frequency of the superimposed component contained in the output from the optical modulator becomes twice the frequency of the operating point control signal, in the MZ light modulator-on the clock modulation side, since the point where the optical output becomes a maximum is only temporary as described above, the detection signal becomes faint so that it is difficult to determine the frequency of the superimposed component. Moreover, in the conventional method, there is also a problem in that when the amplitude of the drive signal is shifted from $2V\pi$, then in the optical output, two bias points exist which generate a superimposed component with twice the frequency of the operating point control signal, and in the case where the operating point is controlled based on either of the bias points as a reference, only output waveforms with deviated duty are obtained, so that normal modulation operation cannot be realized.

Furthermore, in the transmission section of the CS-RZ modulation method as shown in FIG. 32, in order to obtain a desired optical output, an adjustment or a control is required at several points such as the amplitude and the phase between the two drive signals of differential form corresponding to the clock signal, and the phases between the clock signal and the data signal. Therefore, there is a disadvantage in that when providing the additional configurations for the conventional drive control, this invites a higher cost and a larger size for the transmission section.

SUMMARY OF THE INVENTION

The present invention has been accomplished in view of the abovementioned problems with the object of providing a drive control apparatus and a drive control method with a simple configuration, which can also reliably compensate for operating point changes of an optical modulator driven in accordance with a drive signal corresponding to a clock signal.

In order to achieve the above object, according to the present invention, there is provided a drive control apparatus for an optical modulator, in which optical output characteristics with respect to a drive voltage are changed. periodically, comprising; a drive section that supplies, to the optical modulator, a drive signal with a predetermined waveform, whose amplitude is set corresponding to a voltage difference between two adjacent apexes of optical emission or two adjacent apexes of optical extinction in the optical output characteristics with respect to the drive voltage; and an operating point control section that detects power of an optical signal output from the optical modulator and controls an operating point of the optical modulator based on an average value of the power of the optical signal. Also, the drive section may supply a drive signal with a sine wave corresponding to a clock signal to the optical modulator.

In the drive control of such a configuration, the drive signal of a sine wave or the like with the amplitude set to around $2V\pi$ is output from the drive section to the optical modulator, and the optical modulator is then driven in accordance with this drive signal. Then, the power of the optical signal output from the optical modulator is detected by the operating point control section, and the operating point is controlled by adjusting a bias voltage or the like of the optical modulator based on the average value of the power of the optical signal. In this manner, by controlling the operating point utilizing the average value of the optical output power from the optical modulator, then even when the drive signal corresponding to the clock signal is used, it becomes possible to determine reliably the changes of the operating point and compensate for the changes. Therefore, it becomes possible to drive control the optical modulator stably in an optimum condition.

For the above described drive control apparatus, the constitution may be such that when the amplitude of the drive signal is set to be equal to or more than a first threshold determined based on the optical output characteristics with respect to an operating point deviation amount of the optical modulator, the operating point control section controls the operating point of the optical modulator so that the average value of the power of the optical signal becomes a maximum. Also, the constitution may be such that when the amplitude of the drive signal is set to be equal to or less than a second threshold determined based on the optical output characteristics with respect to the operating point deviation amount of the optical modulator, the operating point control section controls the operating point of the optical modulator so that the average value of the optical output power becomes a minimum.

In this manner, the operating point of the optical modulator can be optimized by performing a maximum value control to maximize the average value of the optical output power, or by performing a minimum value control to minimize the average value of the optical output power, according to the amplitude setting of the drive signal.

Moreover, as a specific aspect of the above drive control apparatus, when the optical modulator is provided with a first optical modulation section and a second optical modulation section that is input with an optical signal output from the first modulation section, the drive section comprises; a drive circuit on a data modulation side that supplies, to the first optical modulation section, a drive signal with a waveform corresponding to a data signal, whose amplitude is set corresponding to a voltage difference between adjacent apex on the optical emission side and apex on the optical extinction side of the optical output characteristics with respect to a drive voltage of the first optical modulation section; and a drive circuit on a clock modulation side that supplies, to the second optical modulation section, a drive signal with a waveform corresponding to a clock signal which has a frequency of ½ the bit rate of the data signal, whose amplitude is set corresponding to a voltage difference between two adjacent apexes of optical emission or two adjacent apexes of optical extinction of the optical output characteristics with respect to the drive voltage of the second optical modulation section. Also, the operating point control section controls at least an operating point of the second optical modulation section, based on an average value of power of an optical signal output from the second optical modulation section.

In such a configuration, the optical output from the first optical modulation section, that is driven by the drive signal corresponding to the data signal, is input to the second optical modulation section that is driven by the drive signal corresponding to the clock signal, and the optical signal corresponding to the CS-RZ modulation method is output from the second optical modulation section. At this time, for the second optical modulation section on the clock modulation side, the operating point thereof is controlled by the drive control section based on the average value of the power of the optical signal. As a result, the control of the operating point of the optical modulator on the clock modulation side, which was difficult with the conventional technique, is realized, enabling the optical signal of the CS-RZ modulation method or the like to be stably output.

Further, there is provided a drive control method for an optical modulator, in which optical output characteristics with respect to a drive voltage are changed periodically, wherein a drive signal with a predetermined waveform, whose amplitude is set corresponding to a voltage difference between two adjacent apexes of optical emission or two adjacent apexes of optical extinction in the optical output characteristics with respect to the drive voltage, is supplied to the optical modulator, and power of an optical signal output from the optical modulator is detected and an operating point of the optical modulator is controlled based on an average value of the power of the optical signal.

Other objects, features and advantages of this invention will become apparent from the following description of embodiments, given in conjunction with the appended drawings.

DETAILED DESCRIPTION OF THE INVENTION

Hereunder is a description of embodiments of the present invention based on drawings.

Figure 1:
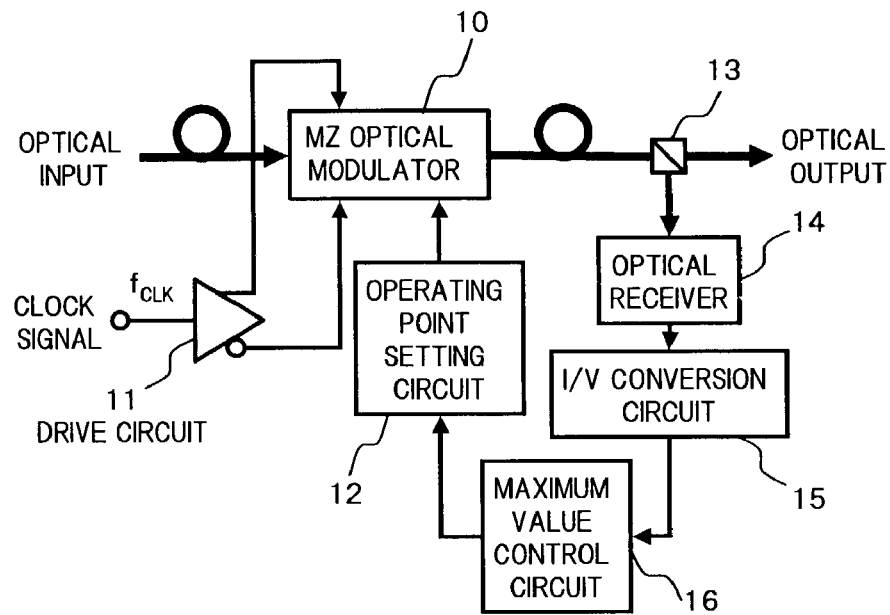
FIG. 1 is a functional block diagram showing a basic configuration of a drive control apparatus for an MZ optical modulator according to the present invention.

FIG. 1 is a functional block diagram showing a basic configuration of a drive control apparatus for an MZ optical modulator according to the present invention.

In FIG. 1, the present drive control apparatus comprises; for example, a drive circuit 11 generating a drive signal to be supplied to an MZ optical modulator 10; an operating point setting circuit 12 setting an operating point of the MZ optical modulator 10; an optical coupler 13 inserted in an optical path on an output side of the MZ optical modulator 10; an optical receiver 14 receiving branched light from the optical coupler 13; an I/V conversion circuit 15 converting a current signal generated by the optical receiver 14 into a voltage signal; and a maximum value control circuit 16 controlling the operating point setting circuit 12 so that an average value of optical output power becomes a maximum, based on the voltage signal from the I/V conversion circuit 15.

The MZ optical modulator 10 is a typical optical modulator in which light input to an input waveguide is branched into two, the branched lights are subjected to complementary phase change in a branching waveguide, and then subjected to multiplexing interference, to be output to an output waveguide. This MZ optical modulator 10, for example, as shown at the top left in FIG. 2, has a characteristic in that optical output characteristics with respect to a drive voltage are changed periodically.

The drive circuit 11 generates two drive signals whose phases differ by approximately 180°, based on a clock signal with a frequency $f_{CLK}$ supplied from the outside, and supplies each drive signal to a pair of the signal electrodes (here not shown in the figure) corresponding to each branching waveguide of the MZ optical modulator 10. For each of the above described drive signals, their respective amplitudes are set, so that a voltage applied to each signal electrode of the MZ optical modulator corresponds to a voltage difference between two adjacent apexes A of optical emission (or two adjacent apexes B of optical extinction) in the optical output characteristics. That is to say, here as shown at the bottom left in FIG. 2, the MZ optical modulator 10 performs a modulation operation at drive amplitude of $2V\pi$.

The operating point setting circuit 12 is a circuit setting the operating point of the MZ optical modulator 10 by supplying a variable bias voltage to the signal electrode of the MZ optical modulator 10. The bias voltage applied to the signal electrode by the operating point setting circuit 12, is for deciding the operating point of the MZ optical modulator, and the value thereof is set according to a result of processing in the maximum value control circuit 16, as described later.

The optical coupler 13 branches a part of the optical signal output from the MZ optical modulator 10 and sends the branched light to the optical receiver 14. The optical receiver 14 receives a monitor light branched by the optical coupler 13 and generates a current signal corresponding to the total power of the monitor light. The current-signal generated by the optical receiver 14 is converted into a voltage signal by the I/V conversion circuit 15 to be sent to the maximum value control circuit 16.

The maximum value control circuit 16 determines the average value of the optical output power of the MZ optical modulator 10, based on the voltage signal from the I/V conversion circuit 15, and feedback controls the setting of the bias voltage of the operating point setting circuit 12 so that the average value becomes a maximum.

Figure 2:
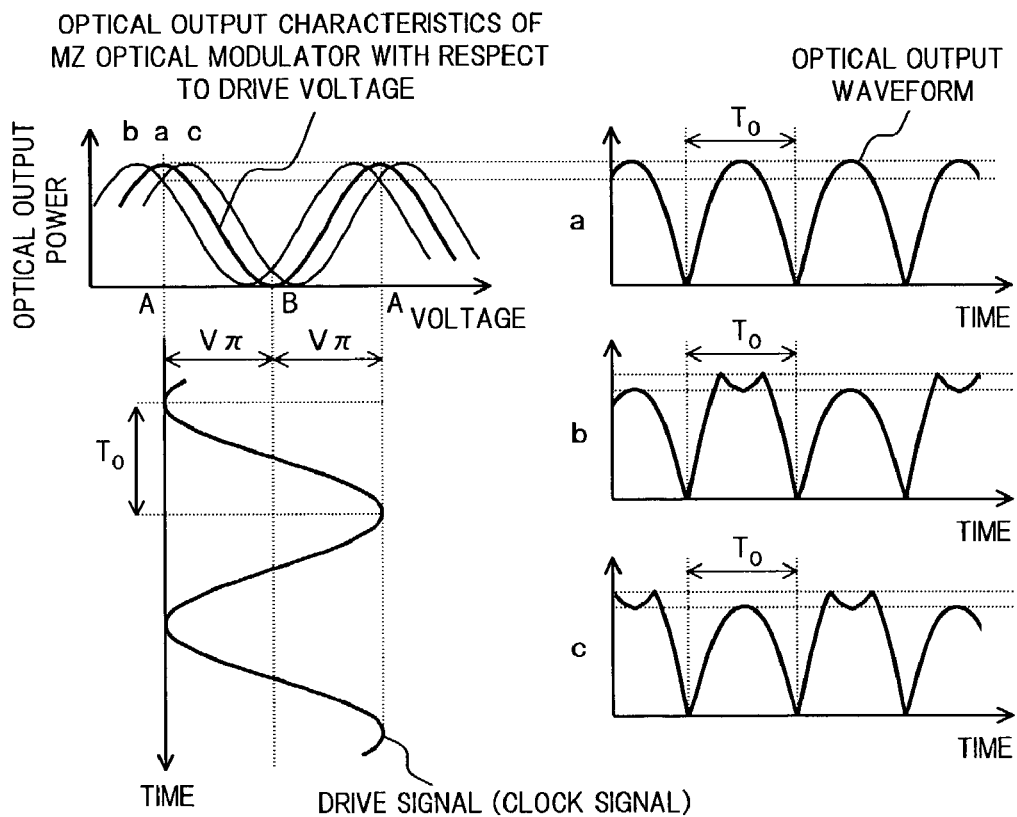
FIG. 2 is a diagram for explaining optical output characteristics of an MZ optical modulator driven by a drive signal corresponding to a clock signal.

In the drive control apparatus of the configuration as described above, the drive signal with amplitude $2V\pi$, which corresponds to the clock signal as shown at the bottom left in FIG. 2, is applied to the MZ optical modulator 10. As a result, continuous light, which is input to the MZ optical modulator 10, is intensity modulated to be output. When the optical output characteristics with respect to the drive voltage of the MZ optical modulator 10 exhibit an ideal curve "a" as shown at the top left in FIG. 2, an optical output waveform of the MZ optical modulator 10 becomes a waveform where an optical emission/optical extinction condition is periodically changed without distortion as shown at the top right in FIG. 2.

Figure 3:
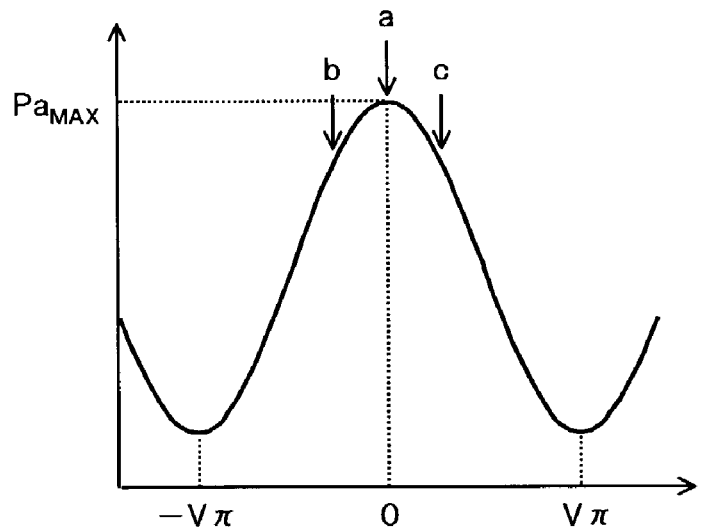
FIG. 3 shows one example of a change in average value of optical output power with respect to a change amount of an operating point in the optical output characteristics of FIG. 2.

On the other hand, when due for example to a temperature change or a change with time, the optical output characteristics of the MZ optical modulator 10 with respect to the drive voltage move from the ideal curve "a", to the left or right to exhibit curve "b" or curve "c", then if the bias voltage has not been optimized corresponding to a change amount of the operating point, the optical output waveform of the MZ optical modulator 10 becomes a waveform with distortions as shown in middle right or bottom right in FIG. 2. At this time, considering a timewise average value of the optical output power, the average value of the optical output power at the time of operating point change is decreased compared to when the operating point is in the optimum condition. In other word, the optical output power of the MZ optical modulator 10 becomes a maximum value when the operating point is optimized. FIG. 3 shows an example of a change in the average value of the optical output power with respect to the change amount of the operating point.

Therefore, in the present drive control apparatus, a part of the optical output from the MZ optical modulator 10 is branched by the optical coupler 13, as the monitor light, and the voltage signal the level of which, is changed in accordance with the total power of the monitor light, is generated by the optical receiver 14 and the I/V conversion circuit 15. Then, the average value of the optical output power from the MZ optical modulator 10 is determined by the maximum value control circuit 16 based on the voltage signal, and the bias voltage of the operating point setting circuit 12 is feedback controlled so that the average value becomes a maximum. As a result, the operating point of the MZ optical modulator 10 is set to the optimum condition.

In this manner, different from the conventional operating point control technique in which the change of the operating point is detected by superimposing a low frequency operating point control signal on the drive signal, in the present drive control apparatus, since the change of the operating point of the MZ optical modulator is determined based on the average value of the optical output power, it becomes possible to reliably determine the change of the operating point to perform the feedback control of the bias voltage, even in the case where a drive signal corresponding to the clock signal is used. Therefore, it is possible to stably control the operating point of the MZ optical modulator 10 to an optimum condition. Such a drive control apparatus is suitable for realizing a drive control of the MZ optical modulator on the clock modulation side, for example in the CS-RZ modulation method.

Next is a description of a more specific embodiment of the drive control apparatus for the MZ optical modulator having the above described basic configuration.

Figure 4:
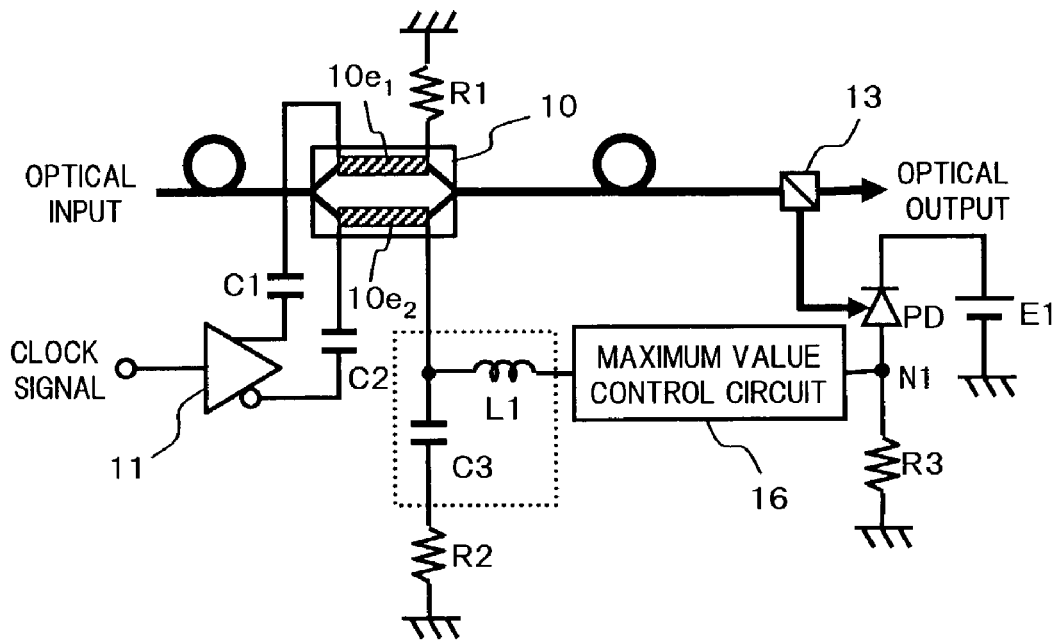
FIG. 4 is a circuit diagram showing a configuration of a drive control apparatus according to a first embodiment of the present invention.

FIG. 4. is a circuit diagram showing a configuration of the drive control apparatus according to a first embodiment. Components of the same configuration as that shown in FIG. 1 are denoted by the same reference numerals, and similarly for the other embodiments hereunder.

In the circuit configuration of FIG. 4, one drive signal generated by the drive circuit 11 that receives the clock signal is applied to one end of a signal electrode $10e_1$ (at the top in FIG. 4) of the MZ optical modulator 10 via a capacitor C1. Moreover, the other drive signal with a phase different of 180° from that of the one drive signal, is applied to one end of a signal electrode $10e_2$ (at the bottom in FIG. 4) of the MZ optical modulator 10 via a capacitor C2. Here, the other end of the signal electrode $10e_1$ of the MZ optical modulator 10 is terminated through a resistor R1. Moreover, the other end of the signal electrode $10e_2$ is terminated through a capacitor C3 in a BIAS-T circuit and a resistor R2.

Furthermore, in the present drive control apparatus, the monitor light branched by the optical-coupler 13 is photoelectric converted by a photodiode PD to which a reverse bias is supplied from a power source E1, and a current signal generated by the photodiode PD is converted into a voltage signal by a resistor R3. An input terminal of the maximum value control circuit 16 is connected to a node N1 where the photodiode PD and the resistor R3 are connected.

Figure 5:
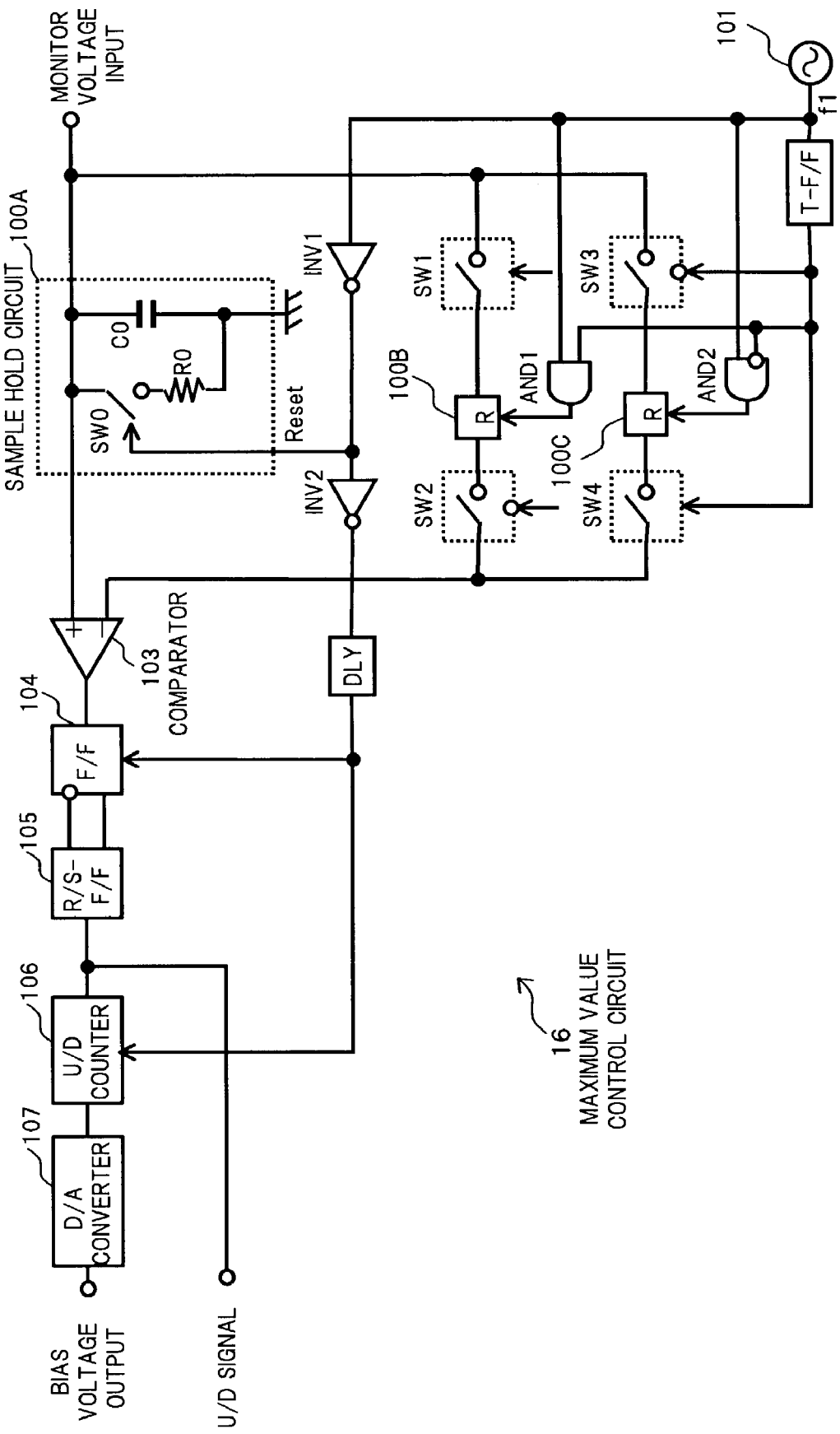
FIG. 5 is a circuit diagram showing a configuration example of a maximum value control circuit used in the first embodiment.

The maximum value control circuit 16 is realized for example by applying a circuit configuration as shown in FIG. 5. More specifically, in the maximum value control circuit 16, a monitor voltage at the node N1 of FIG. 4 is applied to an input terminal and sent to sample hold circuits 100A, 100B and 100C having reset functions, respectively. The sample hold circuit 100A is constructed such that, for example, a capacitor C0, a switch SW0 and resistor R0 are connected in parallel, and an internal clock signal with a frequency f1 generated by an oscillator 101 is supplied as a reset signal via an inverter INV1, and the switch SW0 is opened and closed in synchronous with the reset signal.

In the sample hold circuit 100B and the sample hold circuit 100C, at the front and back thereof, there are respectively provided switches SW1, SW2, and SW3, SW4. To respective control terminals of the switches SW1 to SW4, output signals from a T flip-flop (T-F/F) operating in synchronous with the internal clock signal as described above, are supplied. The sample hold circuits 100B and 100C are of the same configuration as the sample hold circuit 100A, and are reset by a reset signal based on a logical sum of the internal clock signal and the output signal of the T flip-flop.

Figure 6:
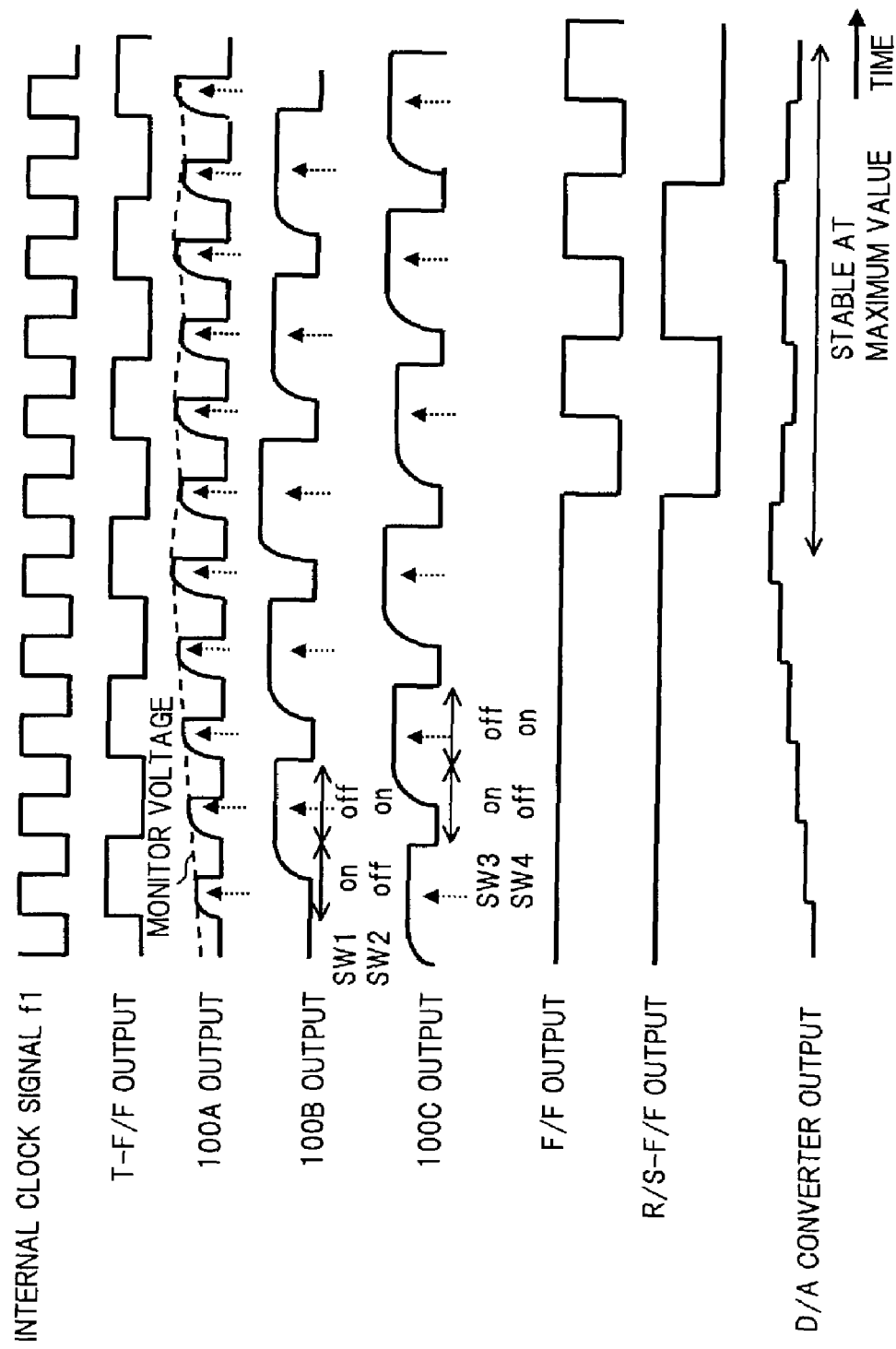
FIG. 6 is a timing chart for explaining an operation of the maximum value control circuit of FIG. 5.

By means of the above described circuit configuration with the combination of the sample hold circuit 100B, 100C and the switches SW1 to SW4, monitor voltages are output alternately from the sample hold circuit 100B and 100C sides, at the timing just before the timing of when a monitor voltage is output from the sample hold circuit 100A. FIG. 6 is a timing chart for explaining an operation of the maximum value control circuit 16, in which, in response to each waveform of the internal clock signal and the output signal from the T flip-flop as shown at the top in the figure, the voltage levels at the output terminals of the sample hold circuits 100A to 100C are changed as shown in the respective waveforms at the middle in the figure.

The monitor voltage output from the sample hold circuit 100A and the monitor voltages alternately-output from the sample hold-circuit 100B and 100C sides, are respectively, input to a comparator 103 wherein the voltage levels thereof are compared with each other, and a signal corresponding to a difference of the voltage level is then output from the comparator 103. In FIG. 6, the timing when the monitor voltages from the sample hold circuits 100A to 100C are compared by the comparator 103, is specified by broken arrows. Then, the output signal from the comparator 103 is sent to a flip-flop (F/F) 104. The flip-flop 104 uses the output signal from the comparator 103 to discriminate an increase or decrease of the monitor voltage, and as shown at the bottom in FIG. 6, a high or low level signal corresponding to the discrimination result is output to an RS flip-flop (R/S-F/F) 105.

A level of output signal of the RS flip-flop 105 is inverted if the output level from the flip-flop 104 is changed from a level taken the just before timing. The output signal from the RS flip-flop 105 is output to an up/down counter (U/D) 106 to be controlled an increase and decrease of count value thereof, and is also output to the outside as an up/down signal. The output signal from the up/down counter 106 is supplied to a D/A converter 107, and a bias voltage corresponding to the count value is applied to the BIAS-T circuit of FIG. 4 from the D/A converter 107.

To the flip-flop 104 and the up/down counter 106, the internal clock signal is supplied as a reset signal through inverters INV1, INV2 and a delay circuit DLY.

The bias voltage output from the D/A converter 107 in the above maximum value control circuit 16 is stably feedback controlled at a condition where the monitor voltage becomes a maximum as shown at the bottom of FIG. 6, that is to say, a condition where the average value of the optical output power becomes a maximum. The bias voltage feedback controlled in this manner is applied to the signal electrode of the MZ optical modulator 10 via the BIAS-T circuit. As a result, it becomes possible to control the operating point of the MZ optical modulator 10 to an optimum condition even if the optical output characteristics with respect to the drive voltage are changed due to the temperature change or the change with time.

Figure 7:
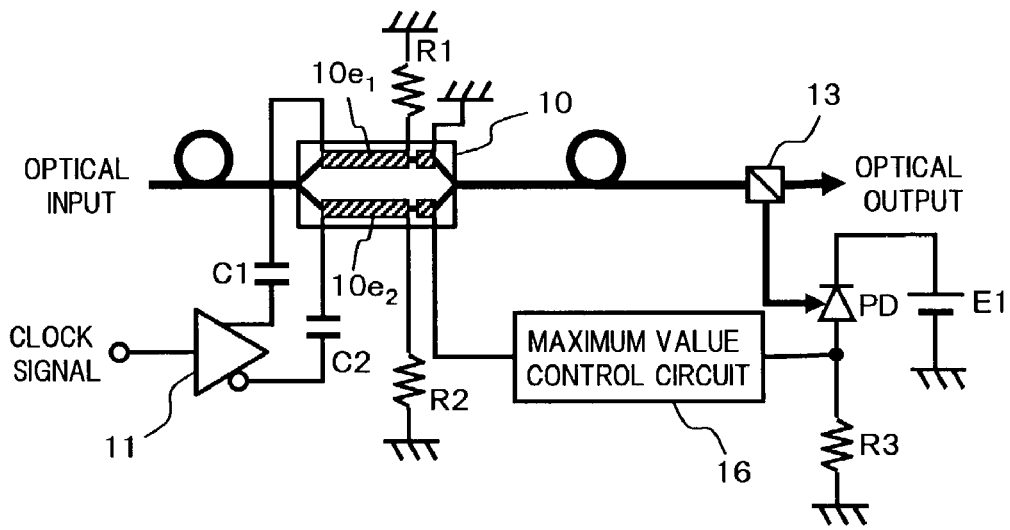
FIG. 7 is a circuit diagram showing another configuration example related to the first embodiment.

In the above first embodiment, the bias voltage is applied to-the signal electrode to which the drive signal for the MZ optical modulator 10 is applied. However, for example as shown in FIG. 7, the bias voltage may be applied. to an electrode which is provided separately from the signal electrode, in order to control the operating-point of the MZ optical modulator. In this case, the BIAS-T circuit used in the first embodiment becomes unnecessary. Moreover, the configuration of the maximum value control circuit 16 is not limited to the example shown in FIG. 5, and various circuits for achieving a similar function may be applied. For example, it is also possible to use the well-known dithering circuit or the like.

Next is a description of a second embodiment of the drive control apparatus for the MZ optical modulator having the aforementioned basic configuration shown in FIG. 1. In the second embodiment, application of the present invention to the MZ optical modulator corresponding to the CS-RZ modulation method is specifically considered.

Figure 8:
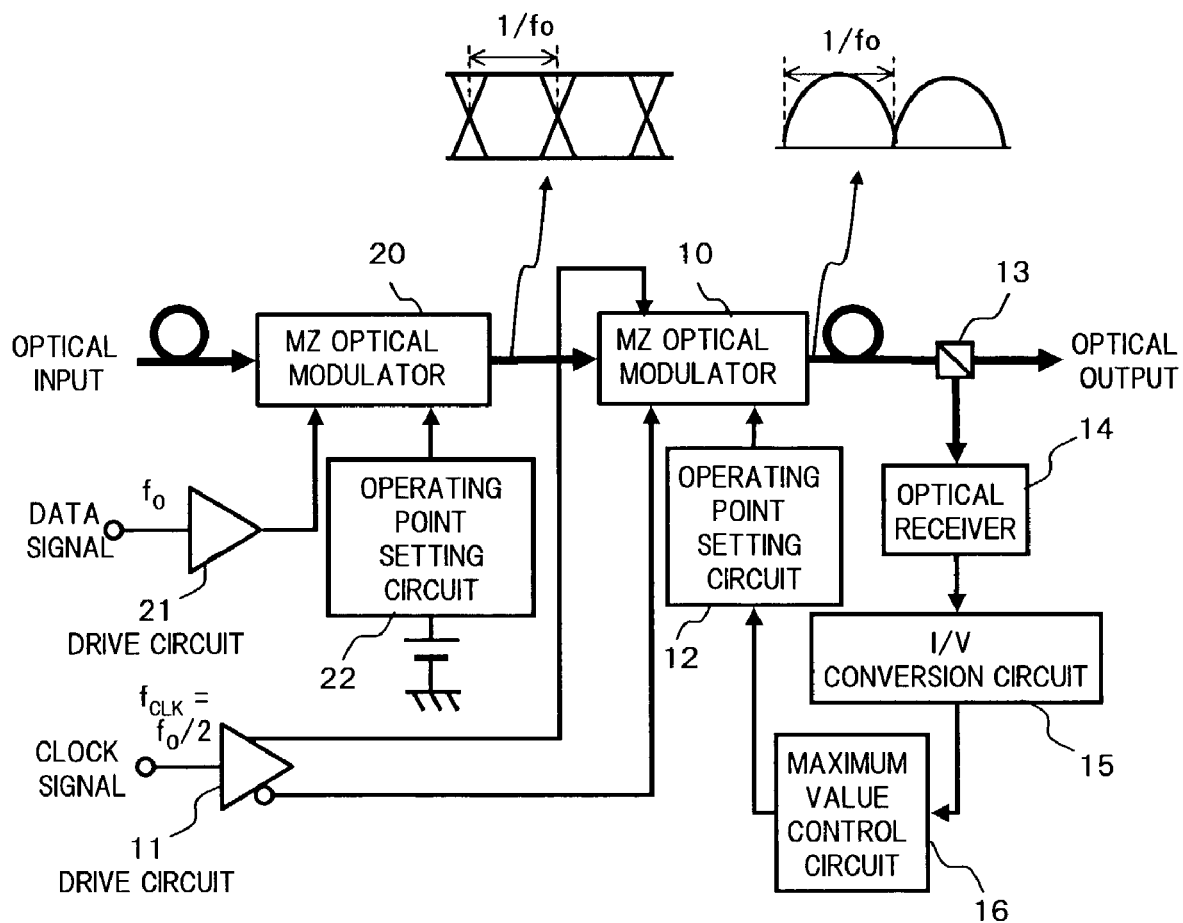
FIG. 8 is a functional block diagram showing a configuration of a drive control apparatus according to a second embodiment of the present invention.

FIG. 8 is a functional block diagram showing the configuration of the drive control apparatus of the second embodiment.

In FIG. 8, the drive control apparatus for the MZ optical modulator according to the present embodiment is configured such that, for example, in a typical structure of the CS-RZ modulation method in which there is sequentially connected; an MZ optical modulator 20 on a data modulation side that is driven in accordance with a drive signal obtained by adjusting a data signal of bit rate fob/s corresponding to the NRZ modulation method by a drive circuit 21 so that the amplitude thereof becomes Vπ, and an MZ optical modulator 10 on a clock modulation side that is driven in accordance with a drive signal obtained by adjusting a clock signal having a frequency $f_{CLK}$ (=$f_0$/2)Hz, that is ½ the bit rate of the above mentioned data signal by a drive circuit 11 so that the amplitude thereof becomes 2Vπ, the aforementioned basic structure shown in FIG. 1 is applied to the MZ optical modulator 10 on a clock modulation side, and the bias voltage of the MZ optical modulator 10 is feedback controlled so that an average value of optical output power becomes a maximum, to thereby optimize the operating point.

The respective MZ optical modulators 20 and 10 on the data modulation side and on the clock modulation side, are typical optical modulators each in which light input to an input waveguide is branched into two in a branching section, the branched lights are subjected to complementary phase change in a branching waveguide, and then subjected to multiplexing interference, to be output to an output waveguide. Each MZ optical modulator 10 and 20 has a characteristic where optical output characteristics thereof with respect to the drive voltage are changed periodically, similarly to the aforementioned case shown at the top left in the FIG. 2.

The drive circuit 21 receives the input of the data signal supplied from the outside, generates a drive signal with the amplitude thereof adjusted so as to correspond to a difference in voltage between adjacent apex A on the optical emission side and apex B on the optical extinction side of the optical output characteristics of the MZ optical modulator 20, and applies the drive signal to a signal electrode of the MZ optical modulator 20. Here, the MZ optical modulator 20 on the data modulation side performs the modulation at the drive amplitude of Vπ.

An operating point setting circuit 22 connected to the MZ optical modulator 20 on the data modulation side is for setting an operating point of the MZ optical modulator 20 by supplying a bias voltage to a signal electrode of the MZ optical modulator 20. For this operating point setting circuit 22, although omitted from the figure, it is assumed the operating point of the MZ optical modulator 20 is optimized by applying an operating point control technique corresponding to the aforementioned conventional NZR modulation method. More specifically, for example, it is possible to perform an operating point control of the MZ optical modulator 20 by superimposing a low frequency signal on the drive signal on the data modulation side, and by detecting the superimposed component from the monitor light branched from the optical output. The monitor light in this case may be taken out by separately inserting an optical coupler in the latter stage of the MZ optical modulator 20, or may be obtained by utilizing the branched light of the optical coupler 13 provided on the latter stage of the MZ optical modulator 10.

The configuration for drive controlling the MZ optical modulator 10 on the clock modulation side is the same as for the case of the aforementioned basic configuration of FIG. 1, or the first embodiment, and description is here omitted.

In the drive control apparatus of the above mentioned configuration, the continuous light-input to the MZ optical modulator 20 on the data modulation side is intensity modulated in accordance with the drive signal of amplitude Vπ corresponding to the data signal, and signal light of NZR format as shown at the top of FIG. 8 is output from the MZ optical modulator 20 on the data, modulation side to the MZ optical modulator 1 ion the clock modulation side. Then, in the MZ optical modulator 10 on the clock modulation side, in accordance with a drive signal of amplitude of 2Vπ corresponding to the clock signal, the optical signal of NZR format which is sent from the MZ optical modulator 20 on the data modulation side is further intensity modulated, and an optical signal with the same waveform as for the case of the RZ modulation method as shown at the top of FIG. 8 is output.

Then, a part of an optical signal corresponding to the CS-RZ modulation method output from the MZ optical modulator 10 on the clock modulation side is branched by the optical coupler 13 and sent to the optical receiver 14 as a monitor light, and then photoelectric converted. The current signal generated by the optical receiver 14 is converted to the voltage signal by the I/V conversion circuit 15 and then supplied to the maximum value control circuit 16. In the maximum value control circuit 16, the average value of the optical output power is determined based on the aforementioned voltage signal, and the bias voltage of the operating point setting circuit 12 is feedback controlled so that this average value becomes a maximum. As a result, the operating point of the MZ optical modulator 10 on the clock modulation side is also set to optimum conditions.

According to the drive control apparatus of the second embodiment as described above, in the CS-RZ modulation method, it becomes possible to stably obtain optimized conditions for not only the operating point of the data modulation MZ optical modulator 20, but also the operating point of the clock modulation MZ optical modulator 10.

Next is a description of a third embodiment of the drive control apparatus of the MZ optical modulator having the above mentioned basic configuration shown in FIG. 1.

Figure 9:
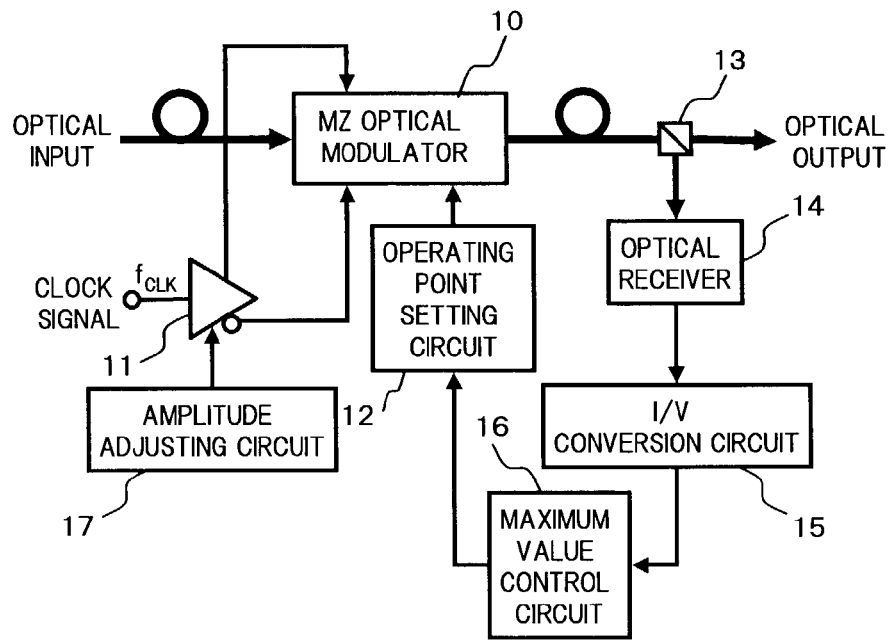
FIG. 9 is a functional block diagram showing a configuration of a drive control apparatus according to a third embodiment in the present invention.

FIG. 9 is a functional block diagram showing the configuration of the drive control apparatus of the third embodiment.

In FIG. 9, the part where the configuration of this drive control apparatus differs from the basic configuration of FIG. 1 is that there is provided an amplitude adjusting circuit 17 adjusting the amplitude of the drive signal corresponding to the clock signal. The, configuration of other parts is the same as for the basic configuration of FIG. 1.

Figure 10:
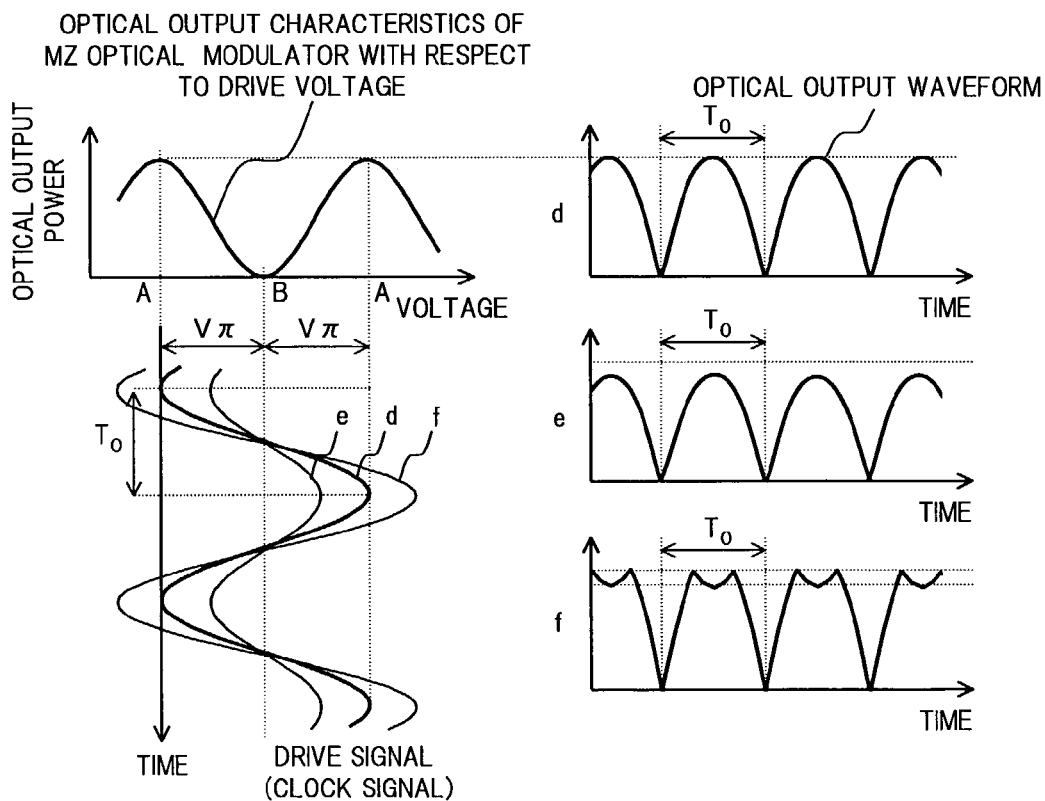
FIG. 10 is diagram for explaining optical output characteristics of an MZ optical modulator with. respect to a change in amplitude of a drive signal in the third embodiment.
Figure 11:
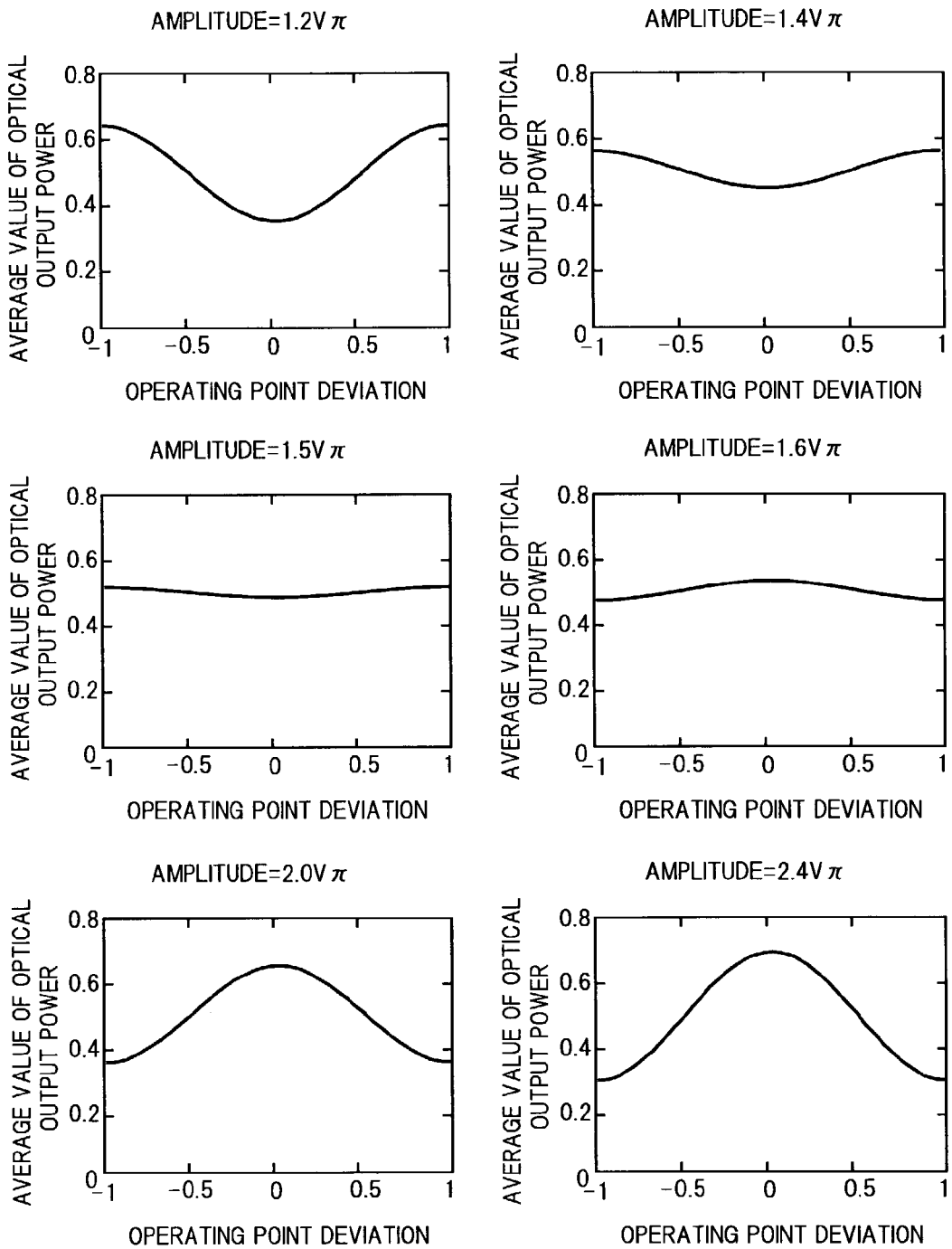
FIG. 11 is a graph showing a change in average value of optical output power with respect to operating point deviation for each amplitude of a drive signal, in the optical output characteristics of FIG. 10.

Here, at first, the optical output characteristics when the amplitude of the drive signal to be applied to the MZ optical modulator 10 is changed, are specifically described referring to FIG. 10 and FIG. 11.

For example, for the MZ optical modulator 10 having an optical output characteristic with respect to the drive voltage as shown at the top left of FIG. 10, in a condition with the operating point optimized, when a drive signal "d" as shown at the bottom left of FIG. 10 with the amplitude thereof adjusted to $2V\pi$ is supplied, the optical output from the MZ optical modulator 10 becomes a waveform as shown at the top right of FIG. 10. On the other hand, in the case where a drive signal "e" with the amplitude smaller than $2V\pi$ is supplied to the MZ optical modulator 10, then as shown at the center right of FIG. 10, an optical output is obtained where the peak power is reduced compared to when the amplitude is $2V\pi$. Furthermore, in the case where a drive signal "f" with the amplitude greater than $2V\pi$ is supplied to the MZ optical modulator 10, then as shown at the bottom right of FIG. 10, an optical output with a distorted waveform is obtained. In this manner, the optical output waveform of the MZ optical modulator 10 driven in accordance with the drive signal corresponding to the clock signal, is influenced by the amplitude change of the drive signal even if the operating point of the MZ optical modulator 10 is optimized. Accordingly, in the optimization control of the operating point of the MZ optical modulator 10, it is desirable to also adjust the amplitude of the drive signal to a suitable condition.

FIG. 11 is an example showing a change of the average value of the optical output power with respect to a deviation amount of the operating point, for each amplitude of the drive signal. As shown in FIG. 11, in the case where the amplitude of the drive signal is $1.2V\pi$, $1.4V\pi$ and $1.5V\pi$, the average value of the optical output power becomes a minimum when the deviation amount of the operating point is 0, that is, when the operating point is optimized. On the other hand, in the case where the amplitude is $1.6V\pi$, $2.0V\pi$ and $2.4V\pi$, the average value of the optical output power becomes a maximum when the operating point is optimized. From this, it can be seen that in the above described control method which controls the bias voltage so that the average value of the optical output power becomes a maximum, to thereby optimize the operating point, it becomes effective for the optimization control when the amplitude of the drive signal is approximately $1.6V\pi$ or more.

The amplitude of the drive signal has a possibility of fluctuations due for example to amplitude fluctuations of the clock signal input to the drive circuit 11, changes in the operating conditions of the drive circuit 11 or the like. Therefore, in this embodiment, an amplitude adjusting circuit 17 is provided so that the operating conditions of the drive circuit 11 can be controlled, and the amplitude of the drive signal supplied to the MZ optical modulator 10 is adjusted so as to be approximately $1.6V\pi$ or more. This amplitude adjustment of the drive signal is not particularly shown in the figure, however, this can be performed for example by monitoring the amplitude of the drive signal supplied from the drive circuit 11 to the MZ optical modulator 10, and feeding back the result to the amplitude adjusting circuit 17.

In this way, according to the drive control apparatus of the third embodiment, by adjusting the amplitude of the drive signal to a suitable condition, it becomes possible to perform more reliably and stably the drive control of the MZ optical modulator 10.

As shown in FIG. 11, in the case where the amplitude of the drive signal is $1.2V\pi$, $1.4V\pi$ and $1.5V\pi$, then by paying attention to the fact that the average value of the optical output power becomes a minimum when the operating point is optimized, an application is also possible for performing an operating point control of the MZ optical modulator 10. That is to say, in a working condition where the MZ optical modulator 10 is driven with the amplitude of the drive signal set to approximately $1.5V\pi$ or less, by feedback controlling the bias voltage so that the average value of the optical output power becomes a minimum, the operating point of the MZ optical modulator 10 can be optimized. Such a control for minimizing the average value of the optical output power can be easily achieved by performing the circuit modification as shown in FIG. 12 on the aforementioned maximum value control circuit 16 shown in FIG. 5.

Figure 12:
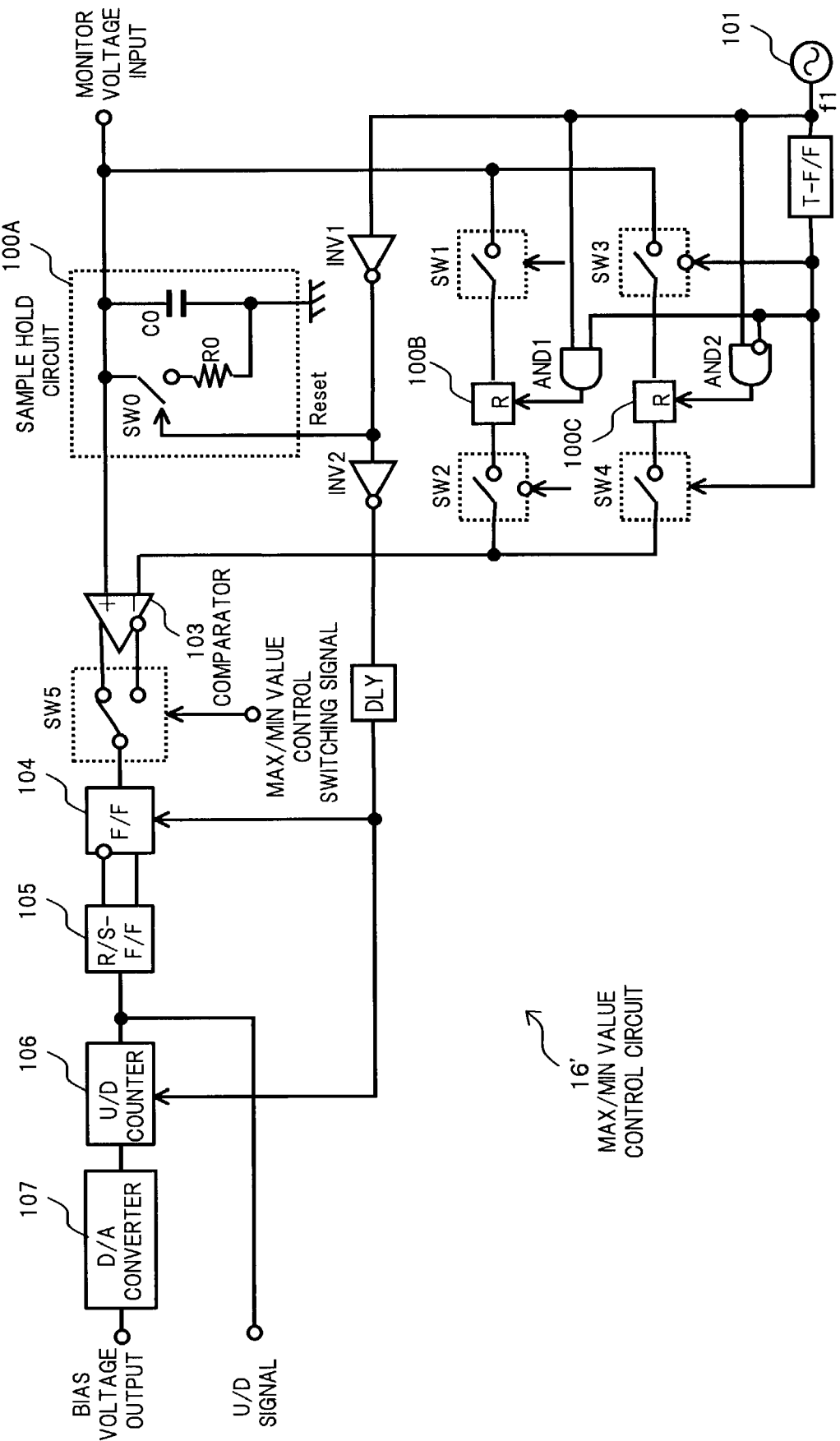
FIG. 12 is a diagram showing a configuration example of a control circuit enabling switching of maximum/minimum value control, related to the third embodiment.

More specifically, the modified points in FIG. 12, are that the comparator 103 comprises a non-inversion output terminal and an inversion output terminal, and there is provided a switch SW5 for switching between maximum and minimum value controls. In such a circuit structure, switching of the contact point of the switch SW5 is performed in accordance with a maximum/minimum value control switching signal supplied from the outside. In the case where the amplitude of the drive signal is set to approximately $1.6V\pi$ or more, the non-inversion output terminal of the comparator 103 is connected to an input terminal of the flip-flop 104 to perform the maximum value control, while in the case where the amplitude is set to approximately $1.5V\pi$ or less, the inversion output terminal of the comparator 103 is connected to the input terminal of the flip-flop 104 to perform the minimum value control. By applying the maximum/minimum value control circuit 16' as shown in FIG. 12 to the drive control apparatus, it becomes possible to optimize the operating point of the MZ optical modulator 10 corresponding to the drive signal having the amplitude of a wider range.

Next is a description of a fourth embodiment of the drive control apparatus according to the present invention. In the fourth embodiment, an application example is considered where for example in the aforementioned third embodiment, a function is provided for detecting whether or not the operating point control of the MZ optical modulator 10 is being performed normally.

Figure 13:
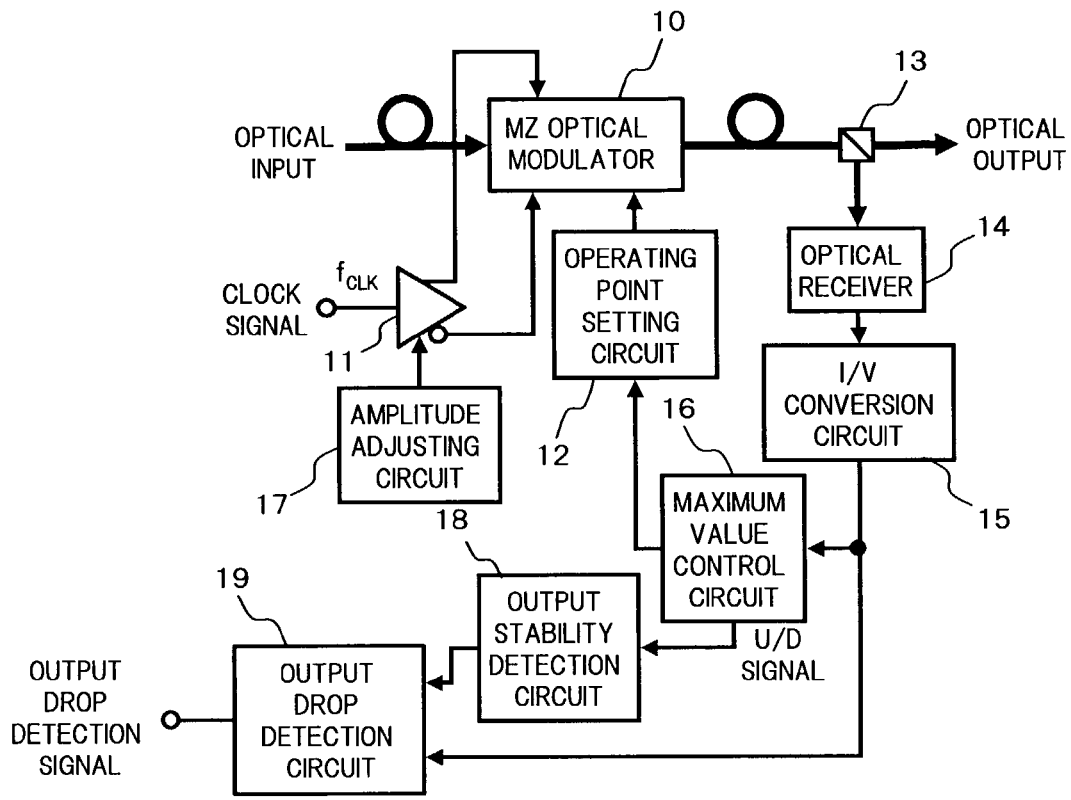
FIG. 13 is a functional block diagram showing a configuration of a drive control apparatus according to a fourth embodiment of the present invention.

FIG. 13 is a functional block diagram showing the configuration of the drive control apparatus of the fourth embodiment.

In FIG. 13, the part where the configuration of this drive control apparatus differs from the configuration of the third embodiment of FIG. 9 is that there is provided an output stability detection circuit 18 to which is input an up/down signal output from the maximum value control circuit 16, and an output drop detection circuit 19 to which is input an output signal from the output stability detection circuit 18 and the voltage signal converted in the I/V conversion circuit 15. The configuration of other parts is the same as for the case of the third embodiment.

Figure 14:
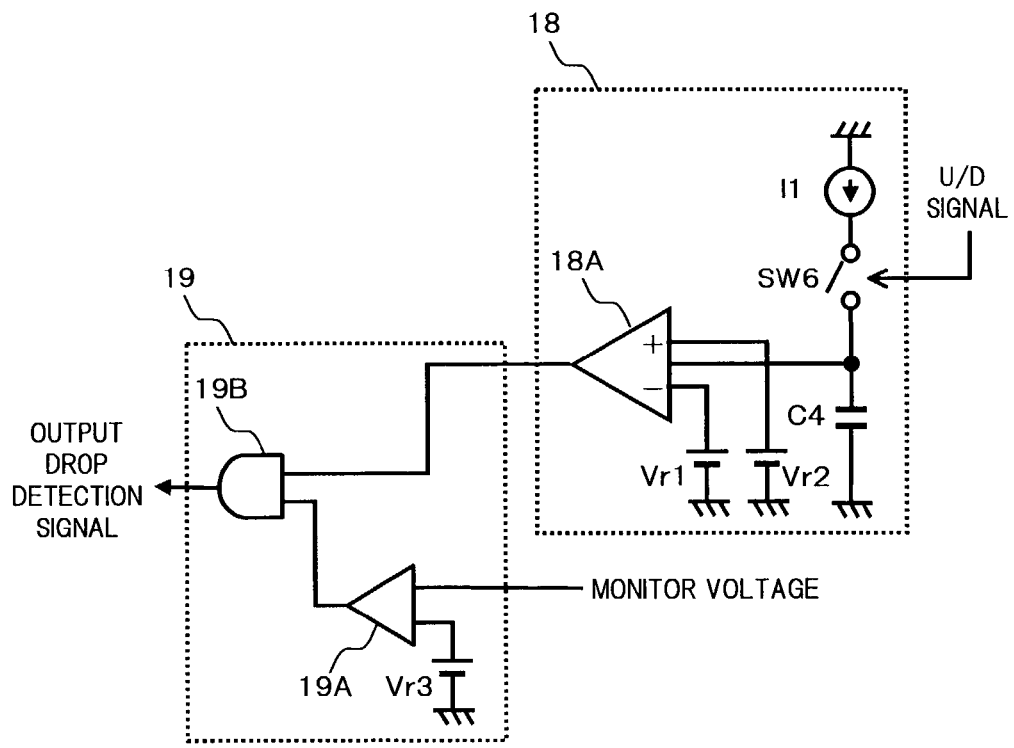
FIG. 14 is a circuit diagram showing a configuration example of an output stability detection circuit used in the fourth embodiment.

In the output stability detection circuit 18, for example, as shown on the right side of FIG. 14, an output voltage of an integration circuit in which a capacitor C4 is charged in response to a switch SW6 that opens/closes in accordance with the up/down signal from the maximum value control circuit 16, is input to a window comparator 18A. In this window comparator 18A, a comparison is made between the input voltage and previously set reference voltages Vr1, Vr2, and in the case where the input voltage is between the reference voltages Vr1, Vr2, a high level signal is output to the output drop detection circuit 19.

The output drop detection circuit 19, for example, as shown on the left side of FIG. 14, includes a comparator 19A and an AND circuit 19B. In the comparator 19A, a comparison is made between the monitor voltage from the I/V conversion circuit 15 and a previously set reference voltage Vr3, and in the case where the monitor voltage is the reference voltage Vr3 or less, a high level signal is output to the AND circuit 19B. In the AND circuit 19B, a logical product of the output signal from the window comparator 18A and the output signal from the comparator 19A is calculated, and the calculation result is output to the outside as an output drop detection signal.

In the drive control apparatus of the above configuration, based on the up/down signal from the maximum value control circuit 16, the output stability detection circuit 18 detects whether or not the bias voltage applied to the MZ optical modulator 10 has been stabilized at the optimum point. More specifically, when the operating point is optimized by the feedback control of the bias voltage by the maximum value control circuit 16, an up signal and a down signal are alternately output from the maximum value control circuit 16. As a result, the input voltage to the window comparator 18A becomes stable at a fixed level due to optimization of the operating point. Therefore, it becomes possible to detect the fact that the bias voltage has been stabilized at the optimum point by performing level judgment of the input voltage in accordance with the previously set reference voltages Vr1, Vr2.

Figure 15:
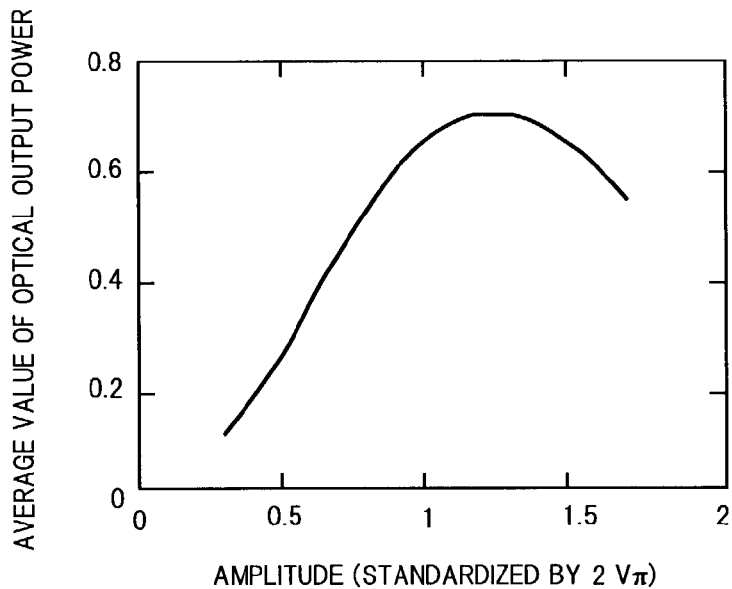
FIG. 15 is a graph showing a relationship of average value of optical output power with respect to amplitude of a drive signal in the fourth embodiment.

When the stabilization of the bias voltage at the optimum point is detected in the above manner, then in the output drop detection circuit 19, detection is performed as to whether or not the amplitude of the drive signal has been appropriately adjusted. This detection process in the output drop detection circuit 19 is performed for example based on a relation shown in FIG. 15 of the average value of the optical output power with respect to the amplitude of the drive signal. The relation shown in FIG. 15 is one showing the average value of the optical output power, by standardizing the amplitude of the drive signal by $2V\pi$, for the condition where the operating point of the MZ optical modulator 10 is optimized. From FIG. 15, it is seen that the average value of the optical output power of when the operating point is optimum, is uniformly increased with the increase in the amplitude of the drive signal over a range of up to approximately $2.4V\pi$. Considering such a relation, if the amplitude of the drive signal is adjusted to a value capable of operating point optimization (more specifically to $1.6V\pi$ or more) based on the above mentioned maximum value control, the monitor voltage input to the comparator 19A of the output drop detection circuit 19 becomes a level exceeding a predetermined threshold value, and if the amplitude is not appropriately adjusted, the monitor voltage becomes the threshold value or less. Consequently, in the output drop detection circuit 19, by detecting that the monitor voltage is the threshold value or less, and outputting an output drop detection signal, it becomes possible to notify the outside of a situation that the amplitude of the drive signal has not been adjusted within an appropriate range and the bias voltage has been stabilized.

Next is a description of a fifth embodiment of the drive control apparatus of the MZ optical modulator having the aforementioned basic configuration shown in FIG. 1.

Figure 16:
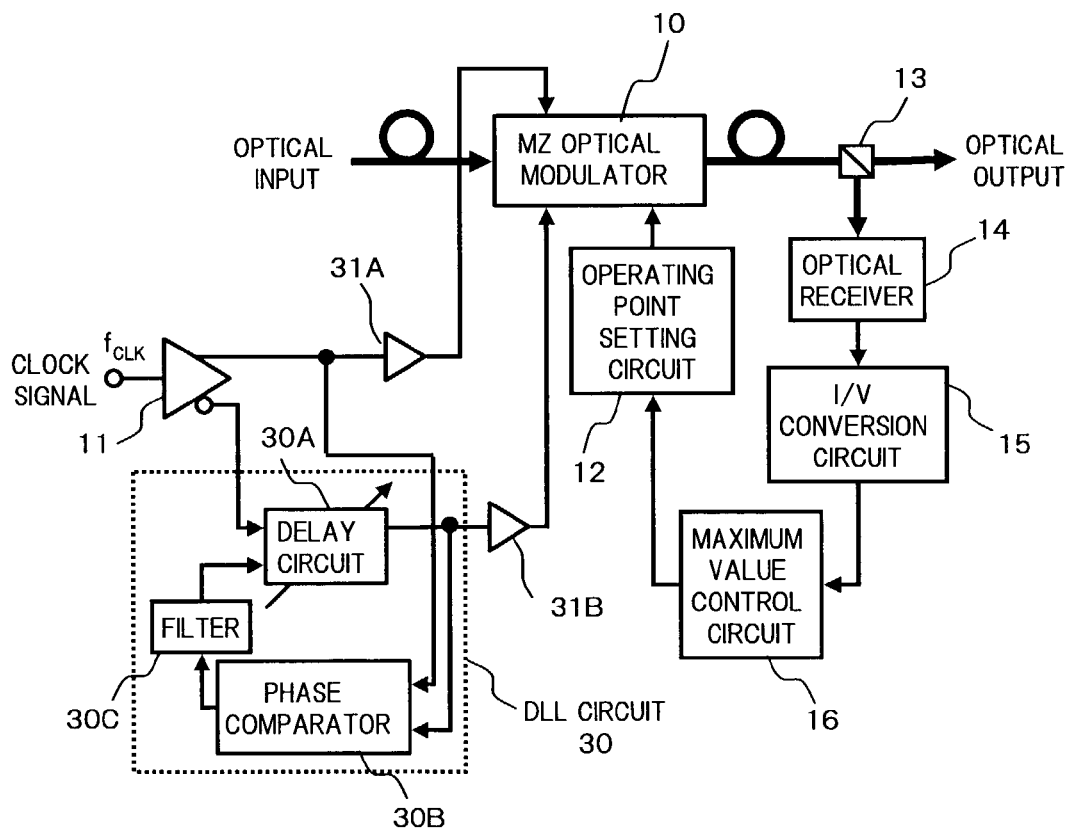
FIG. 16 is a functional block diagram showing a configuration of a drive control apparatus according to a fifth embodiment of the present invention.

FIG. 16 is a functional block diagram showing the configuration of the drive control apparatus of the fifth embodiment.

In FIG. 16, the part where the configuration of this drive control apparatus differs from the basic configuration of FIG. 1 is that a delay lock loop (DLL) circuit 30, and amplifiers 31A and 31B are disposed on a signal line between the drive circuit 11 and the signal electrode of the MZ optical modulator 10. The configuration of other parts is the same as for the basic configuration of FIG. 1.

The DLL circuit 30 includes, for example, a variable delay circuit 30A, a phase comparator 30B and a filter 30C.

The variable delay circuit 30A is a known circuit that provides a variable phase delay to a drive signal output from the inversion output terminal of the drive circuit 11. The phase comparator 30B compares a phase of a drive signal output from the non-inversion output terminal of the drive circuit 11 and a phase of a drive signal output from the variable delay circuit 30A, to output a signal corresponding to a phase difference. The filter 30C removes unnecessary components from the output signal of the phase comparator 30B. A phase delay amount in the variable delay circuit 30A is controlled in accordance with the signal passed through the filter 30C.

An amplifier 31A is provided on the signal line on the non-inversion output side of the drive circuit 11, for adjusting the amplitude of one of the drive signals. Furthermore, an amplifier 31B is provided on the signal line on the inversion output side of the drive circuit 11 at the latter stage of the DLL circuit 30, for adjusting the amplitude of the other drive signal.

In the drive control apparatus of the above described configuration, even in the case where the lengths of the signal paths correcting the respective output terminals of the drive circuit 11 and the respective signal electrodes of the MZ optical modulator 10 are different from each other, the phase difference between the various drive signals applied to the respective signal electrodes of the MZ optical modulator 10 is controlled to an appropriate value.

Figure 17:
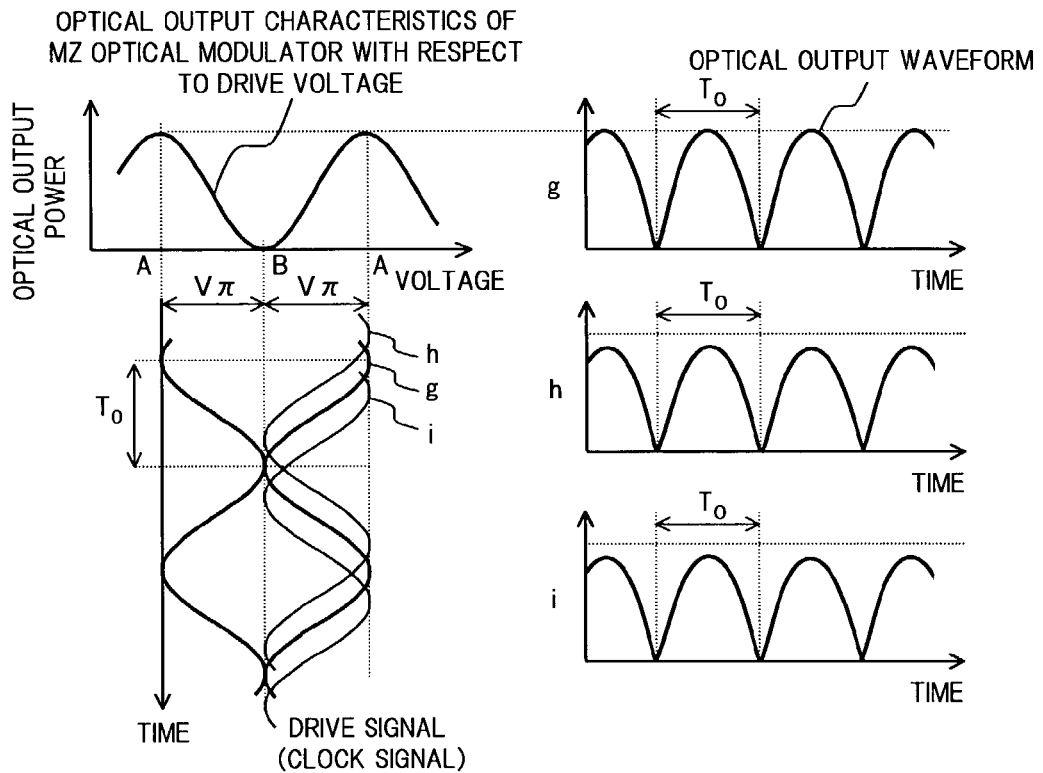
FIG. 17 is a diagram for explaining optical output characteristics of an MZ optical modulator with respect to a phase difference between drive signals, in the fifth embodiment.
Figure 18:
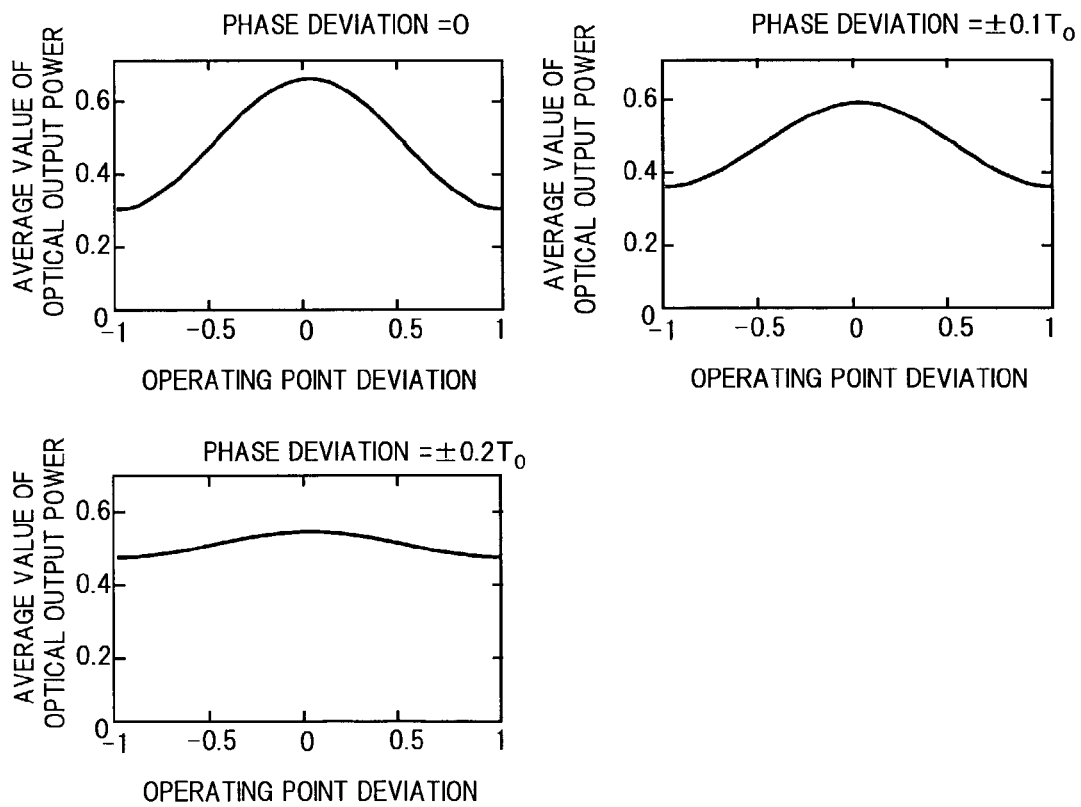
FIG. 18 is a graph showing a change in average value of optical output power with respect to a deviation amount of an operating point, for each deviation amount from an optimum phase difference, in the optical output characteristics of FIG. 10.

Here, the optical output characteristics with respect to the phase difference between the drive signals applied to the respective signal electrodes of the MZ optical modulator 10, will be specifically described referring to FIG. 17 and FIG. 18.

For example, in a condition with the operating point optimized, when a drive signal "g" as shown at the bottom left of FIG. 17 with a phase difference with respect to the one drive signal controlled to 180° is supplied to the MZ optical modulator 10 having an optical output characteristic with respect to a drive voltage as shown at the top left of FIG. 17, the optical output of the MZ optical modulator 10 has a waveform as shown at the top right of FIG. 17. On the other hand, in the case where drive signals "h" and "i" with phase differences deviated from 180° are supplied, then as shown at the center and bottom right of FIG. 17, optical outputs are obtained where the peak power is reduced compared to when the phase difference is 180°. In this manner, the optical output waveform of the MZ optical modulator 10 driven by a drive signal corresponding to the clock signal, is influenced by the deviation from the optimum phase difference of the drive signals applied to the respective signal electrodes, even if the operating point of the MZ optical modulator 10 is optimized.

FIG. 18 is an example showing the change in the average value of the optical output power with respect to the deviation amount of the operating point, for each of the deviation amounts from. the optimum phase difference. As shown in FIG. 18, in the case where the deviation amounts from the optimum phase difference when the half cycle of the clock signal is $T_0$, are 0, $\pm 0.1T_0$ and $\pm 0.2T_0$, the average value of the optical output power becomes a maximum when the deviation amount of the operating point is 0, that is, when the operating point is optimized. From this, it can be seen that in the above described control method. which controls the bias voltage so that the average value of the optical output power becomes a maximum, to thereby optimize the operating point, the optimization control becomes effective when the deviation amount from the. optimum phase difference is $\pm 0.2T_0$ or less.

Therefore, in this embodiment, the DLL circuit 30 is provided so that the phase of the drive signal can be controlled, and the deviation amount from the optimum phase difference (180°) of the drive signal supplied to the respective signal electrodes of the MZ optical modulator 10 is controlled to ±0.2T$_0$ or less. As a result, it becomes possible to perform more reliably and stably the operating point control of the MZ optical modulator 10.

Next is a description of a sixth embodiment of the drive control apparatus according to the present invention. In the sixth embodiment, an application example is considered where for example in the aforementioned fifth embodiment, a function is provided for detecting whether or not the operating point control of the MZ optical modulator 10 is being performed normally.

Figure 19:
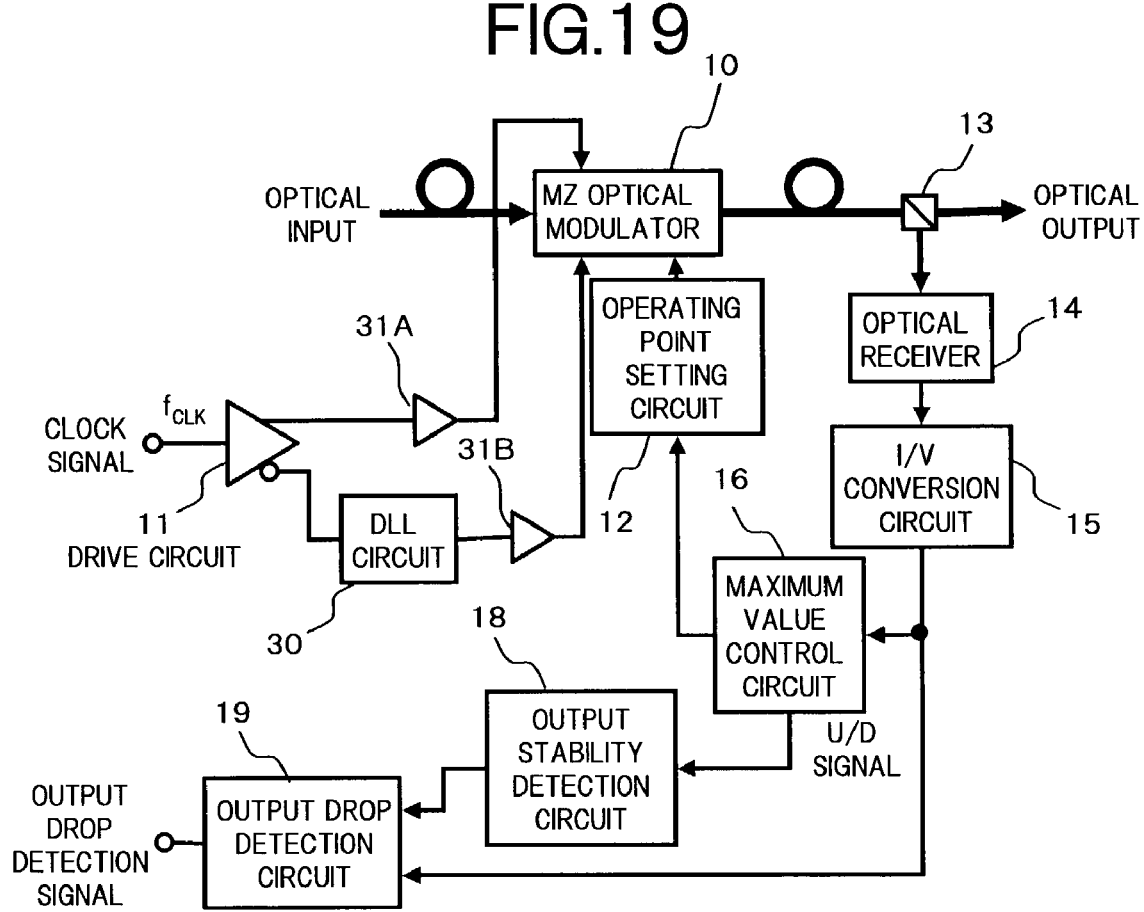
FIG. 19 is a functional block diagram showing a configuration of a drive control apparatus according to a sixth embodiment of the present invention.

FIG. 19 is a functional block diagram showing the configuration of the drive control apparatus of the sixth embodiment.

In FIG. 19, the part where the configuration of this drive control apparatus differs from the configuration of the fifth embodiment of FIG. 16 is that there is provided an output stability detection circuit 18 to which is input an up/down signal output from the maximum value control circuit 16, and an output drop detection circuit 19 to which is input an output signal from the output stability detection circuit 18 and the voltage signal converted in the I/V conversion circuit 15. The configuration of other parts is the same as for the case of the fifth embodiment. Further, the output stability detection circuit 18 and the output drop detection circuit 19 are the same as those used in the fourth embodiment.

Figure 20:
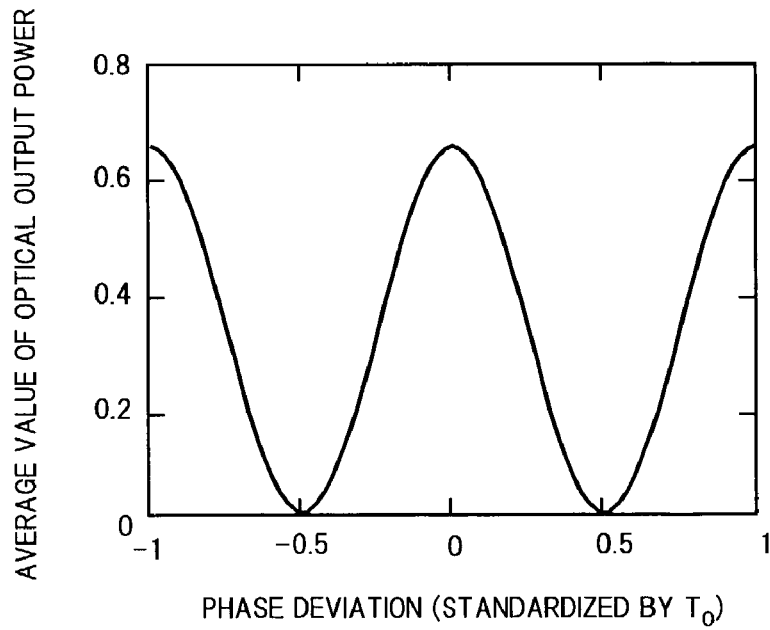
FIG. 20 is a graph showing a relationship of average value of optical output power with respect to a deviation amount from an optimum phase difference between drive signals, in the sixth embodiment.

In this drive control apparatus, similar to the case of the fourth embodiment, detection is made by the output stability detection circuit 18 as to whether or not the bias voltage has been stabilized at the optimum point, and when stability is detected, detection is made by the output drop detection circuit 19 as to whether or not the deviation amount from the optimum phase difference is appropriately controlled. This detection processing in the output drop detection circuit 19 is performed, for example, based on a relation of the average value of the optical output power with respect to the deviation amount from the optimum phase difference as shown in FIG. 20. The relation shown in FIG. 20 is one showing the average value of the optical output power, by standardizing the deviation amount from the optimum phase difference standardized by T$_0$, for the condition where the operating point of the MZ optical modulator 10 is optimized. From FIG. 20, it is seen that the average value of the optical output power of when the operating point is optimum, drops with an increase in deviation amount from the optimum phase difference. Consequently, in the output drop detection circuit 19, by detecting that the monitor voltage has become the threshold value or less to output an output drop detection signal, it becomes possible to notify the outside of a situation that the deviation amount from the optimum phase difference has not been controlled within an appropriate range and the bias voltage has been stabilized.

Next is a description of a seventh embodiment of the drive control apparatus according to the present invention. In the seventh embodiment, for an application example of phase control of the drive signal, an example is considered where for example in the MZ optical modulator corresponding to the CS-RZ modulation method as described above in the second embodiment, the phase difference between the drive signal on the data modulation side and the drive signal on the clock modulation side is controlled.

Figure 21:
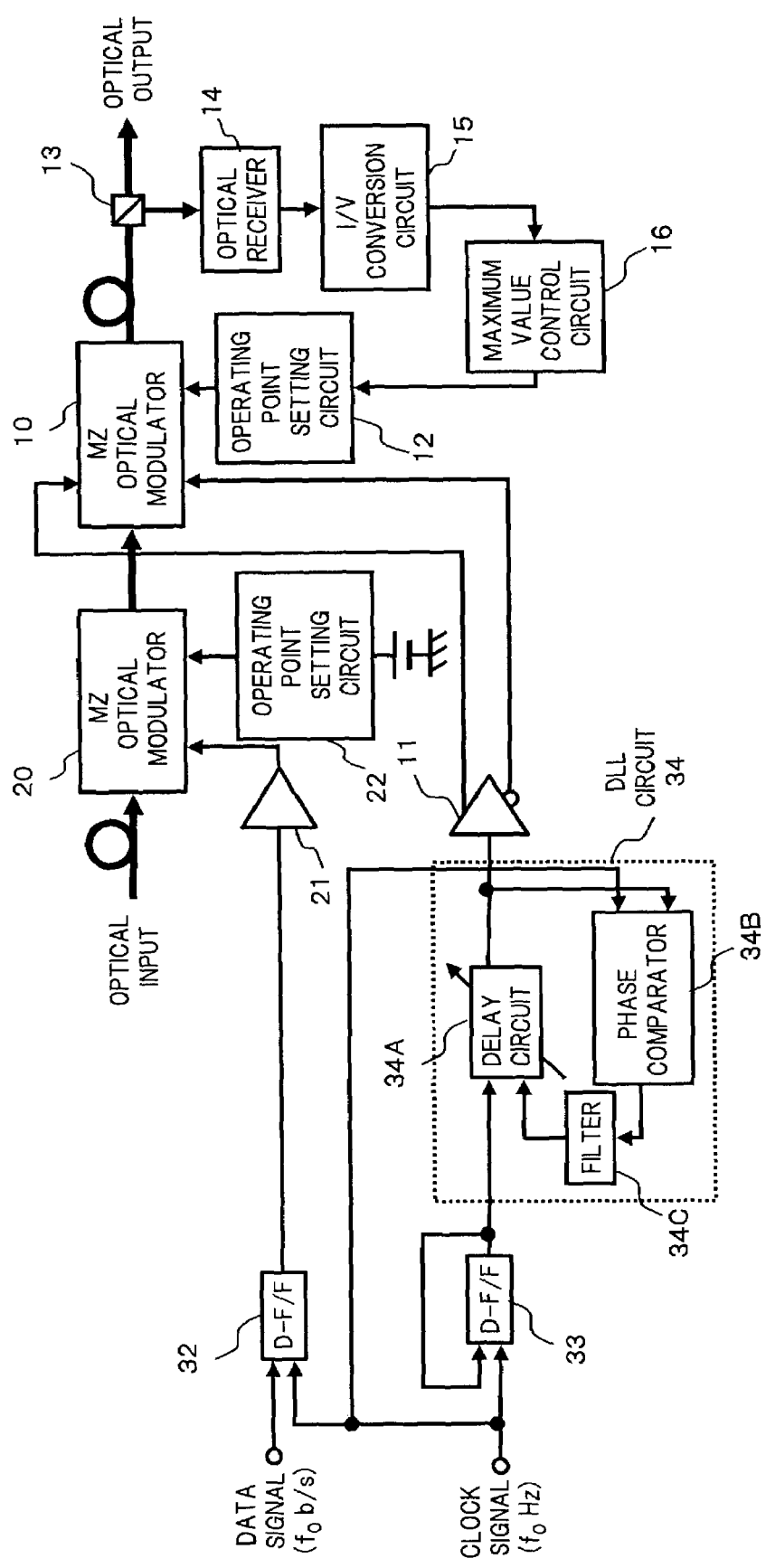
FIG. 21 is a functional block diagram showing a configuration of a drive control apparatus according to a seventh embodiment of the present invention.

FIG. 21 is a functional block diagram showing the configuration of the drive control apparatus of the seventh embodiment.

In FIG. 21, this drive control apparatus is configured such that, for example in the configuration of the aforementioned second embodiment shown in FIG. 8, there is provided a D flip-flop 32 performing phase synchronization of the data signal having a bit rate of f$_0$ b/s, and the clock signal having a frequency of f$_0$ Hz, a D flip-flop 33 frequency dividing the clock signal to generate a signal of a frequency of f$_0$/2 Hz, and a DLL circuit 34 controlling the phase difference between the clock signal and the data signal generated by the D flip-flop 33.

The DLL circuit 34 has the same configuration as the DLL circuit 30 used in the aforementioned fifth embodiment shown in FIG. 16. Here, a phase difference between the clock signal of frequency f$_0$/2 Hz output from a variable delay circuit 34A and the clock signal of frequency f$_0$ Hz sent to the D flip-flop 32 is detected by a phase comparator 34B.

In the drive control apparatus of the above mentioned configuration, the phase difference between the data signal and the clock signal used for driving the MZ optical modulator corresponding to the CS-RZ modulation method is optimally controlled by a simple configuration. Hence, an optical signal modulated by the CS-RZ method can be stably generated.

Figure 22:
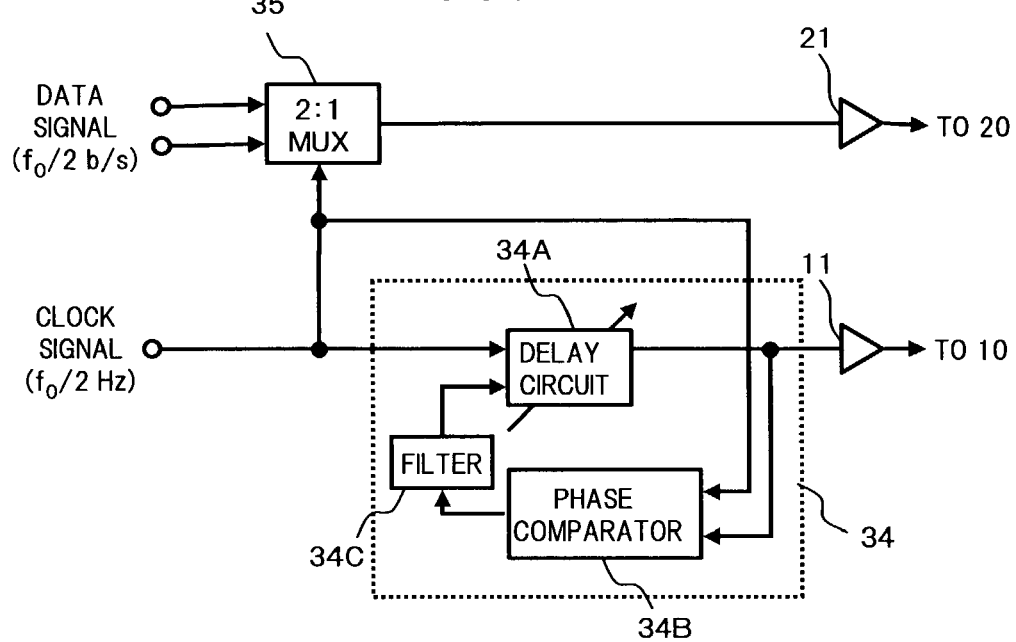
FIG. 22 is a circuit diagram showing another configuration example related to the seventh embodiment.

In the seventh embodiment, the phase difference between the data signal and the clock signal is controlled using the D flip-flops 32, 33 and the DLL circuit 34. However, other than this, for example as shown in FIG. 22, it is also possible to control the phase difference between the data signal and the clock signal by combining a 2:1 multiplexer (MUX) 35 with the DLL circuit 34. In this case, two data signals with bit rate of f$_0$/2 b/s are combined in the multiplexer 35 while being phase synchronized with the clock signal of the frequency f$_0$/2 Hz, to be used as the data modulation drive signal, and the phase difference between the clock signal output from the variable delay circuit 34A of the DLL circuit 34 and the clock signal sent to the multiplexer 35 is detected by the phase comparator 34B.

Next is a description of an eighth embodiment of the drive control apparatus according to the present invention. In the eighth embodiment, an application example is considered for controlling the amplitude of the drive signal to be constant, for example in the aforementioned third embodiment (FIG. 9).

Figure 23:
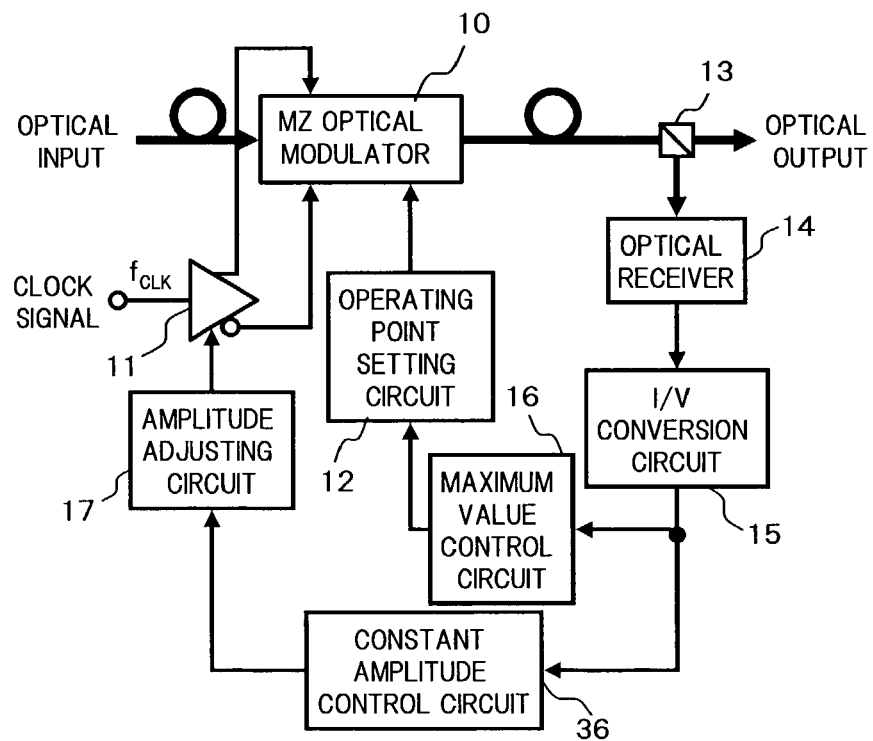
FIG. 23 is a functional block diagram showing a configuration of a drive control apparatus according to an eighth embodiment of the present invention.

FIG. 23 is a functional block diagram showing the configuration of the drive control apparatus of the eighth embodiment.

In FIG. 23, the part where the configuration of this drive control apparatus differs from the configuration of the third embodiment is that there is provided a constant amplitude control circuit 36 controlling the amplitude of the drive signal to be constant based on the optical output level of the MZ optical modulator 10. The configuration of other parts is the same as for the case of the third embodiment.

The constant amplitude control circuit 36 determines the level of the optical output from the MZ optical modulator 10 based on the voltage signal from the I/V conversion circuit 15, and controls the operating conditions of the drive circuit 11 via the amplitude adjusting circuit 17 so that the level becomes constant at a previously set value. The optical output level from the MZ optical modulator 10, as is also apparent from the aforementioned relationship shown in FIG. 15, is changed corresponding to the amplitude of the drive signal in a state where the operating point is optimized.

Therefore, it becomes possible to control the amplitude of the drive signal to a constant value by adjusting the operating conditions of the drive circuit 11 so that the optical output level becomes constant.

Figure 24:
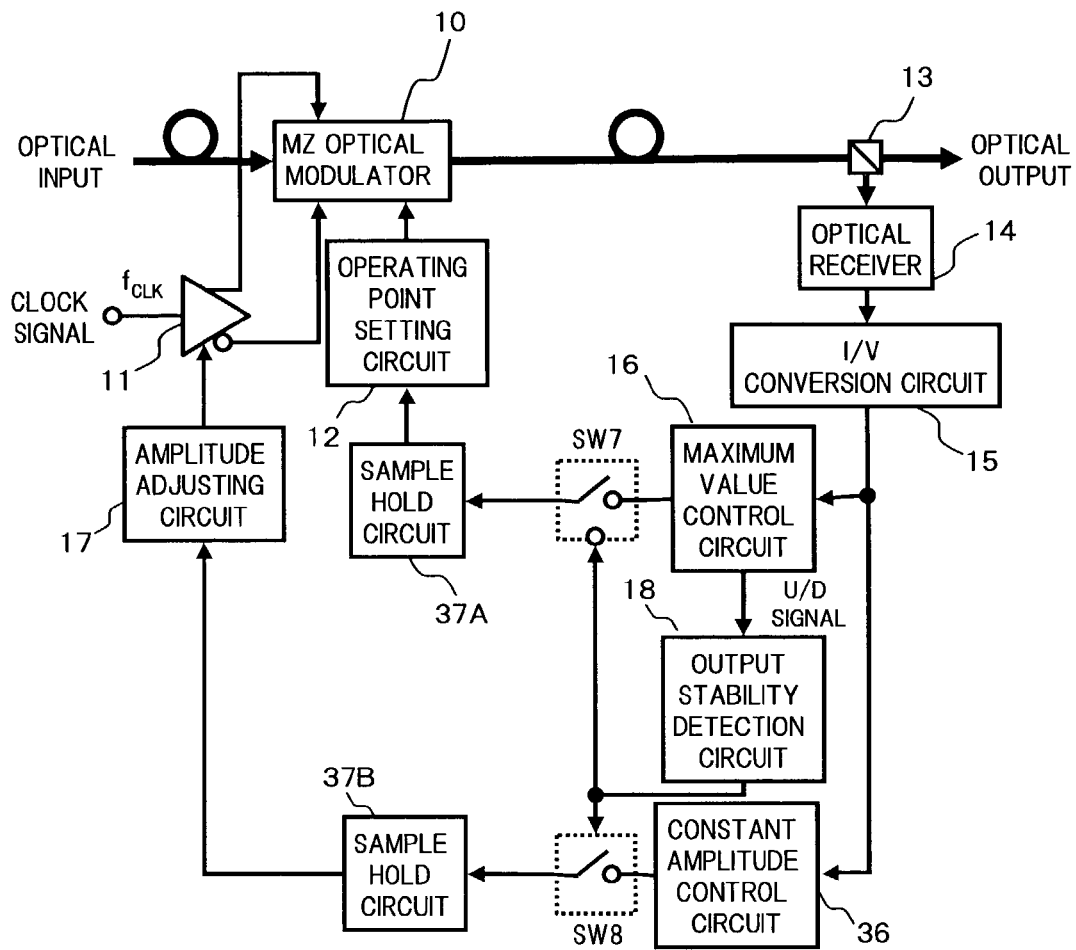
FIG. 24 is a diagram showing a specific example of a circuit for enabling switching of control, in the eighth embodiment.
Figure 25:
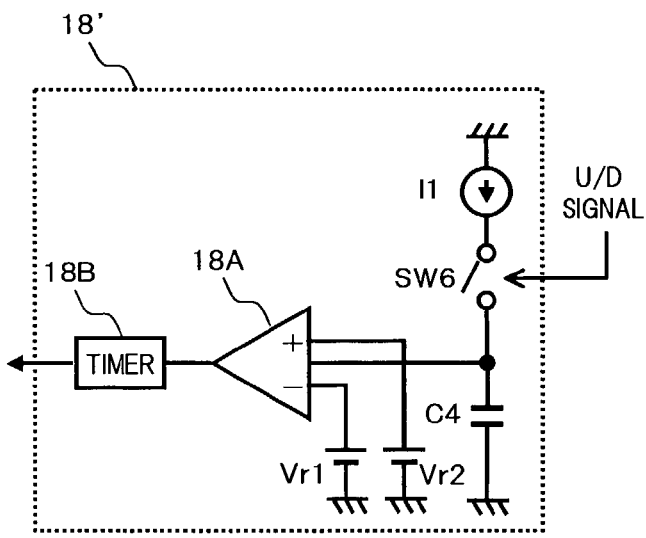
FIG. 25 is a diagram showing a preferred configuration example of an output stability detection circuit used in the circuit of FIG. 24.

Note, basically, it is desirable to switchingly perform the constant control of the amplitude of the drive signal by the constant amplitude control circuit 36, and the optimization control of the operating point by the maximum value control circuit 16. Such switching of control can be achieved specifically by the circuit structure as shown in FIG. 24, for example. In the circuit structure of FIG. 24, the aforementioned output stability detection circuit 18 used for example in the fourth embodiment (FIG. 13) is utilized, and by linking the opening/closing of switches SW7 and SW8 in accordance with the output signal thereof, the optimization control of the operating point via a sample hold circuit 37A and the constant control of the amplitude via a sample hold circuit 37B are switched. As a preferable configuration of the output stability detection circuit 18 utilized here, for example as shown by an output stability detection circuit 18' of FIG. 25, there may be provided a timer 18B holding, for a constant period of time, the detection results of output stabilization indicated by an output signal from a window comparator 18A, to thereby achieve stabilization of the respective control operations.

Moreover, here the drive conditions of the drive circuit 11 are controlled to control the amplitude of the drive signal. However, in the case where losses of the respective signal lines which connect between the drive circuit 11 and the MZ optical modulator 10 are different, there may be provided a circuit structure capable of separately adjusting the amplitude of each drive signal output from the drive circuit 11.

In this manner, according to the eighth embodiment, by performing the constant control of the amplitude of the drive signal based on the level of the monitor light obtained by branching a part of the optical output from the MZ optical modulator 10, it becomes possible to drive control even more stably the MZ optical modulator 10.

Next is a description of a ninth embodiment of the drive control apparatus according to the present invention. In the ninth embodiment, an application example is considered for controlling, to an optimum value, the phase difference between the respective drive signals applied to the signal electrodes of the MZ optical modulator 10, for example in the aforementioned fifth embodiment (FIG. 16).

Figure 26:
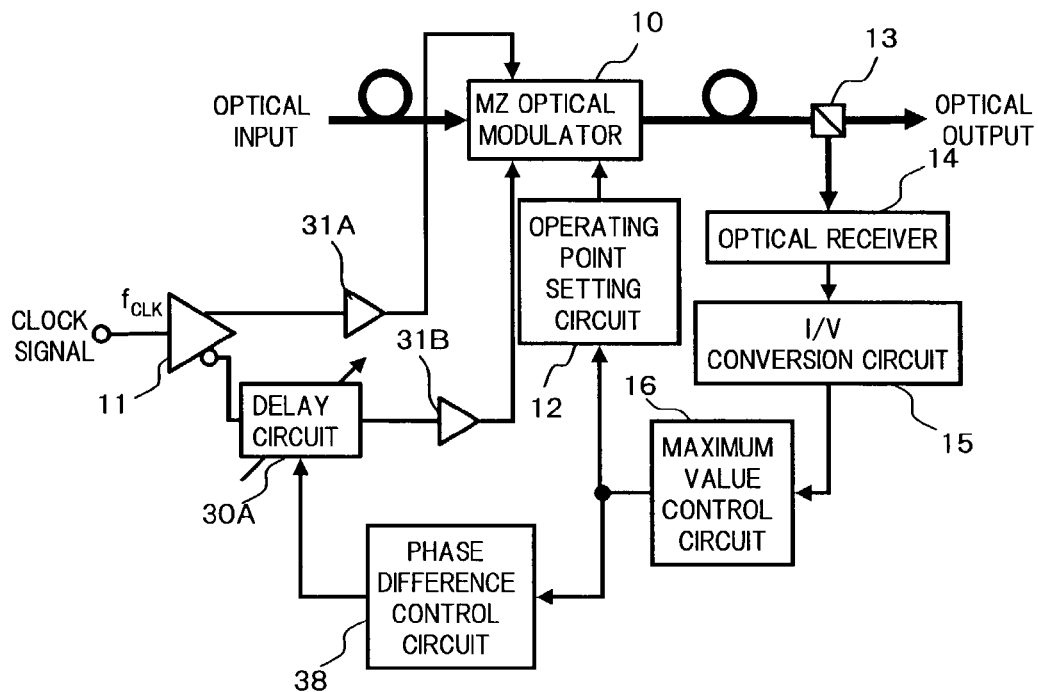
FIG. 26 is a functional block diagram showing a configuration of a drive control apparatus according to a ninth embodiment in the present invention.

FIG. 26 is a functional block diagram showing a configuration of the drive control apparatus of the ninth embodiment.

In FIG. 26, the part where the configuration of this drive control apparatus differs from the configuration of the fifth embodiment is that there is provided a phase difference control circuit 38 controlling a phase delay amount in the variable delay circuit 30A that adjusts the phase difference between the drive signals, in accordance with the output signal from the maximum value control circuit 16. The configuration of other parts is the same as for the case of the fifth embodiment.

The deviation amount from the optimum phase difference of the respective drive signals supplied to the MZ optical modulator 10, as is also apparent from the aforementioned relationship shown in FIG. 20, becomes smallest when the optical output level from the MZ optical modulator 10 is maximum. Therefore, it becomes possible to control the phase difference between the respective drive signals to an optimum value, by adjusting, in accordance with the output signal from the maximum value control circuit 16, the phase delay amount of the variable delay circuit 30A by the phase difference control circuit 38 so that the optical output level becomes a maximum.

Figure 27:
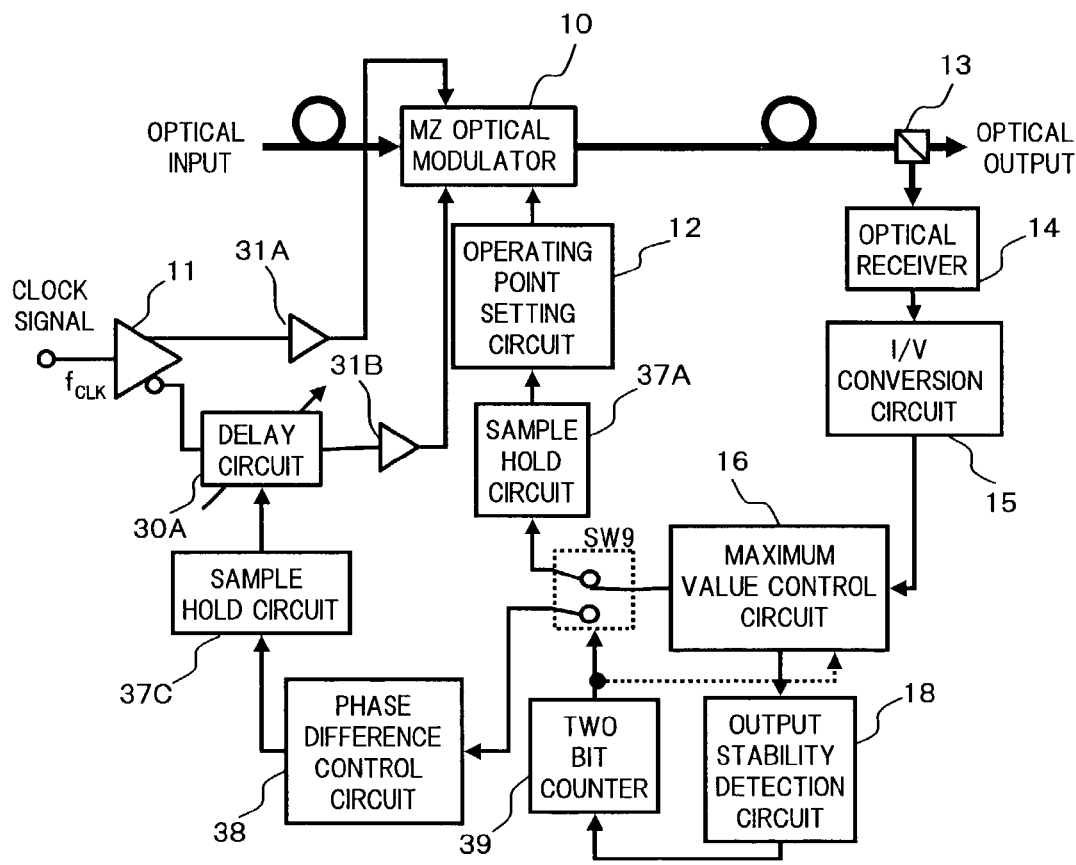
FIG. 27 is a diagram showing a specific example of a circuit for enabling switching of control, in the ninth embodiment.

Basically, it is also desirable to switchingly perform the optimization control of the phase difference between the drive signals by the phase difference control circuit 38 and the optimization control of the operating point by the maximum value control circuit 16. Such switching of control can be achieved specifically for example by the circuit structure as shown in FIG. 27. In the circuit structure of FIG. 27, the aforementioned output stability detection circuit 18 used for example in the fourth embodiment (FIG. 13) is utilized, and by changing the connection condition of a switch SW9 in accordance with a signal output from a two bit counter 39 counting the level change of the output signal from the output stability detection circuit 18, the optimization control of the operating point via the sample hold circuit 37A and the optimization control of the phase difference via the sample hold circuit 37C are switched. Furthermore, the amplitude of the drive signal is set to a small value of approximately 1.5Vπ or less, and in the case where a circuit structure capable of switching the aforementioned maximum/minimum value control as shown in FIG. 12 is applied, then as shown by the broken line arrow in FIG. 27, the output signal from the two bit counter 39 may be supplied to the circuit 16 as a maximum/minimum value control switching signal.

In this manner, according to the ninth embodiment, by optimally controlling the phase difference between the respective drive signals based on the output signal from the maximum value control circuit 16, it becomes possible to drive control stably the MZ optical modulator 10 under more desirable conditions.

Next is a description of a tenth embodiment of the drive control apparatus according to the present invention. In the tenth embodiment, an application example is considered where a combined configuration of the aforementioned eighth and ninth embodiments, that is to say, the optimizing control of the operating point of the MZ optical modulator 10, the constant control of the amplitude of the drive signal and the optimizing control of the phase difference between the drive signals, are simultaneously achieved.

Figure 28:
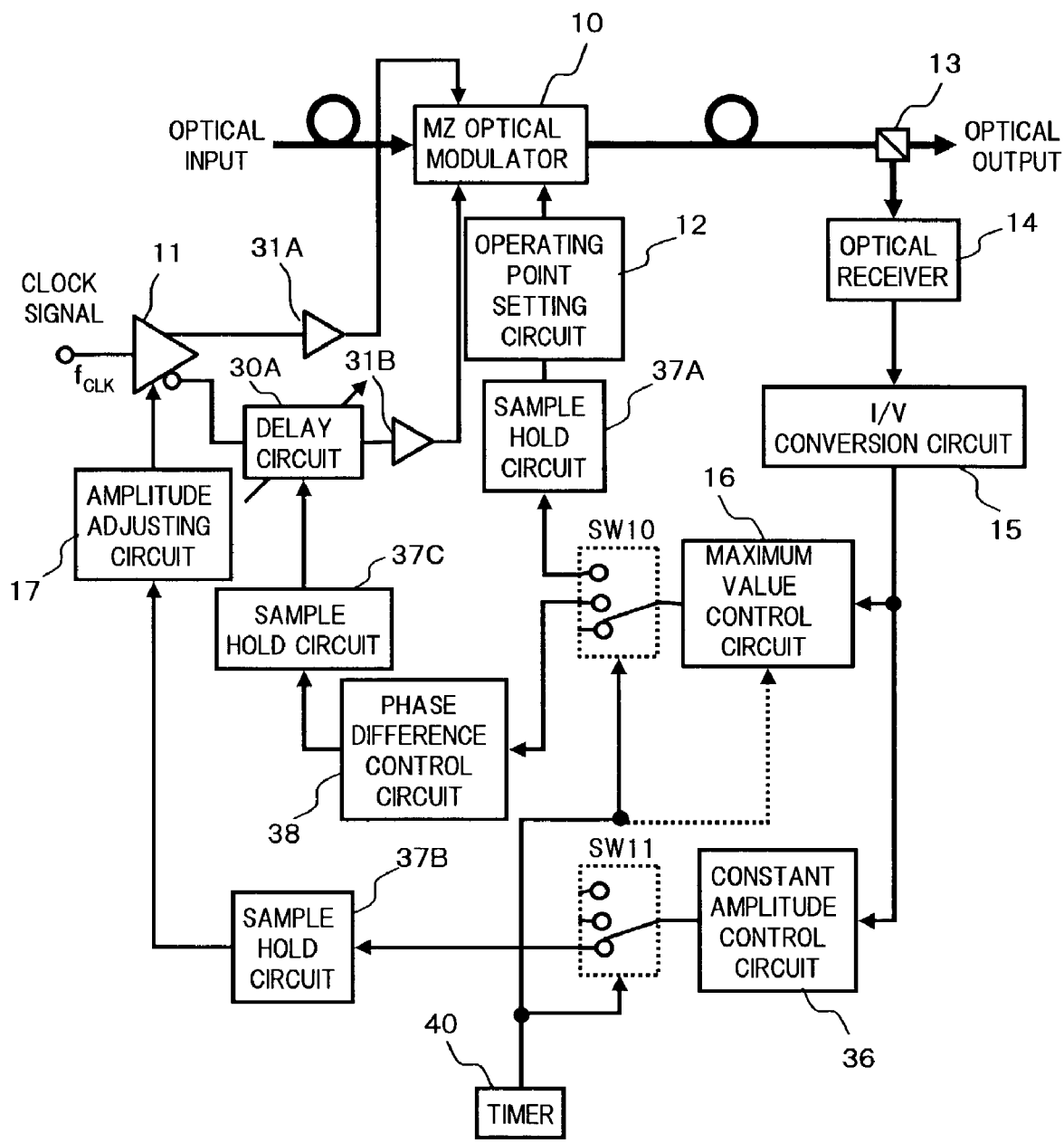
FIG. 28 is a functional block diagram showing a configuration of a drive control apparatus according to a tenth embodiment in the present invention.

FIG. 28 is a functional block diagram showing the configuration of the drive control apparatus of the tenth embodiment.

The circuit structure of FIG. 28 is one where the optimization control of the operating point by the maximum value control circuit 16, the constant amplitude control of the drive signal by the constant amplitude control circuit 36 and the optimization control of the phase difference between the drive signals by the phase difference control circuit 38 are sequentially switched by means of three bit switches SW10 and SW11 in each of which three contact points are switched in synchronism with a count signal from a timer 40. The respective control operations are the same as for the case of the aforementioned respective embodiments, and accordingly the description thereof is omitted here.

According to the drive control apparatus of the above described configuration, the amplitude of the drive signal is controlled to be constant, and at the same time, the operating point of the MZ optical modulator 10 and the phase difference between the drive signals are respectively optimized. Therefore, it becomes possible to drive control the MZ optical modulator 10 under even more stable conditions.

Figure 29:
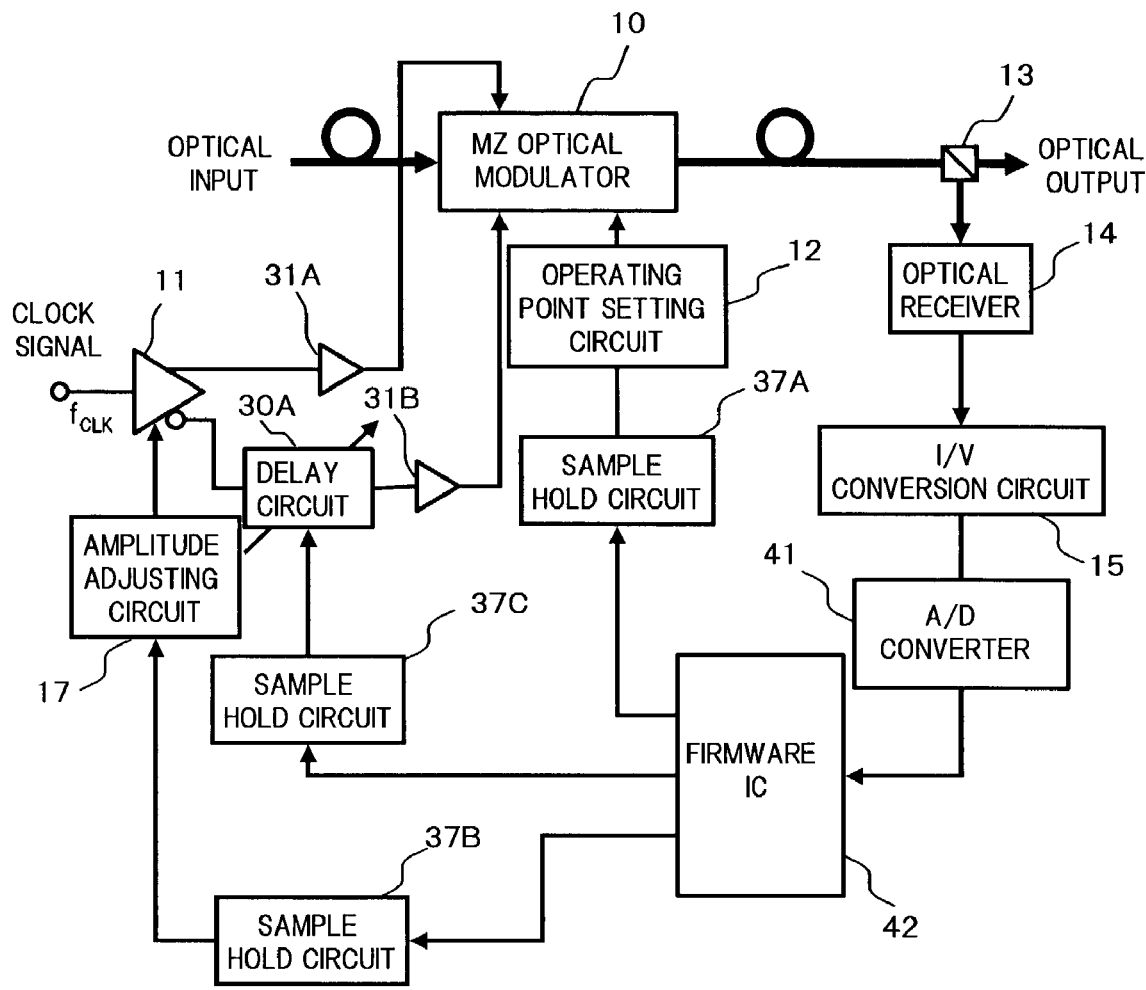
FIG. 29 is a circuit diagram showing another configuration example related to the tenth embodiment.

In the aforementioned circuit structure of the tenth embodiment, for example as shown in FIG. 29, it is also possible to convert the voltage signal from the I/V conversion circuit 15 into a digital signal by an A/D converter 41 and then input this to a firmware IC 42 such as a PLD, and sequentially switch and execute the respective controls by writing the respective processing contents of the optimization control of the operating point, the constant amplitude control of the drive signal and the optimization control of the phase difference into the firmware IC 42. By having such a structure, a smaller size low cost drive control apparatus can be realized.

Furthermore, in the abovementioned third through sixth embodiments and eighth through tenth embodiments, the description has been given for the configuration corresponding to the MZ optical modulator 10 driven by the drive signal corresponding to the clock signal. However, the configuration of these respective embodiments may of course be applied to a drive control apparatus on the clock modulation side in an MZ optical modulator of the CS-RZ modulation method.

Figure 30:
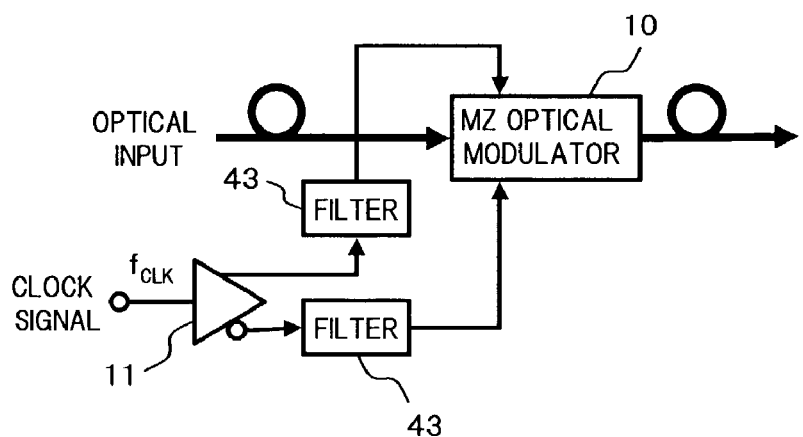
FIG. 30 is a diagram showing an application example related to each of the abovementioned embodiments.
Figure 31:
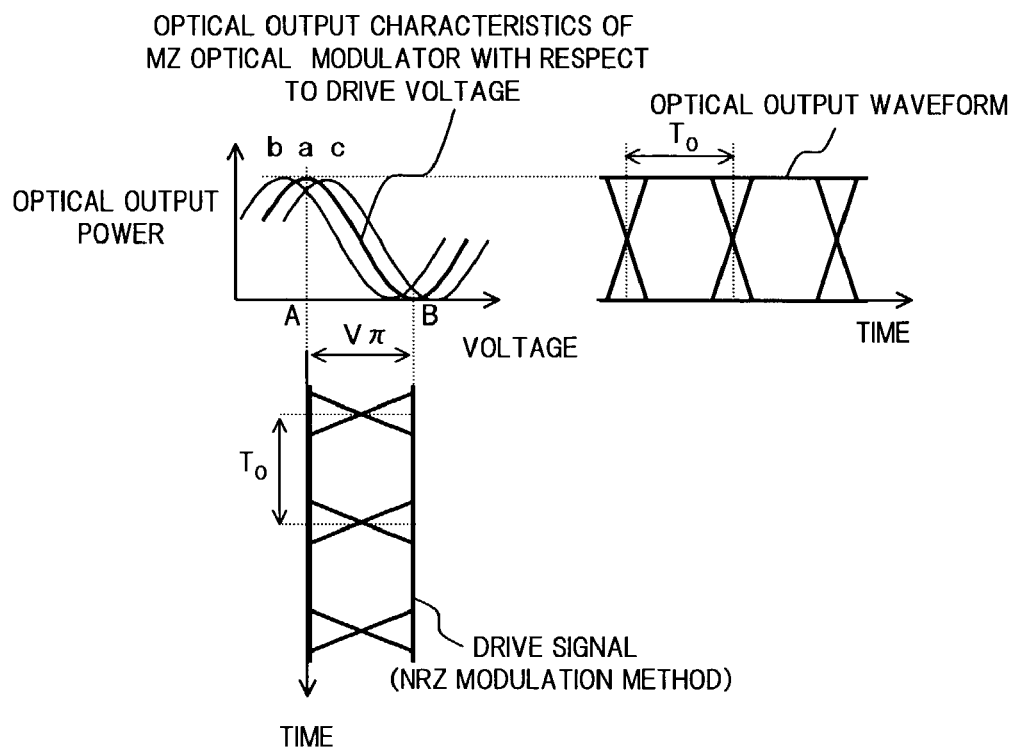
FIG. 31 is a diagram showing an example of optical output characteristics with respect to a drive signal for a typical MZ optical modulator.
Figure 32:
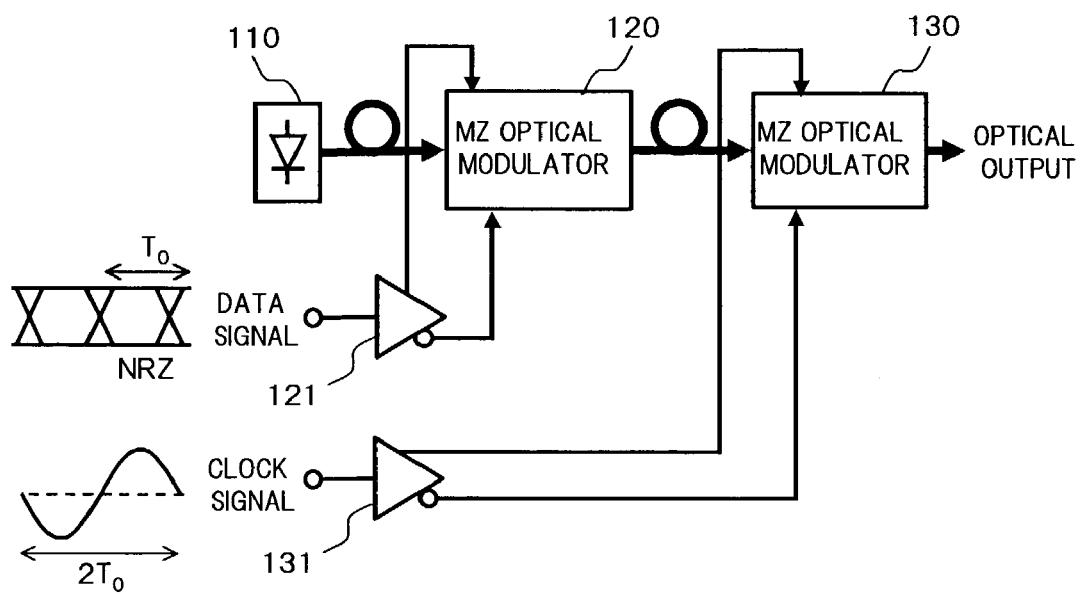
FIG. 32 is a diagram showing a configuration example of a drive control apparatus of an MZ optical modulator corresponding to a conventional CS-RZ modulation method.
Figure 33:
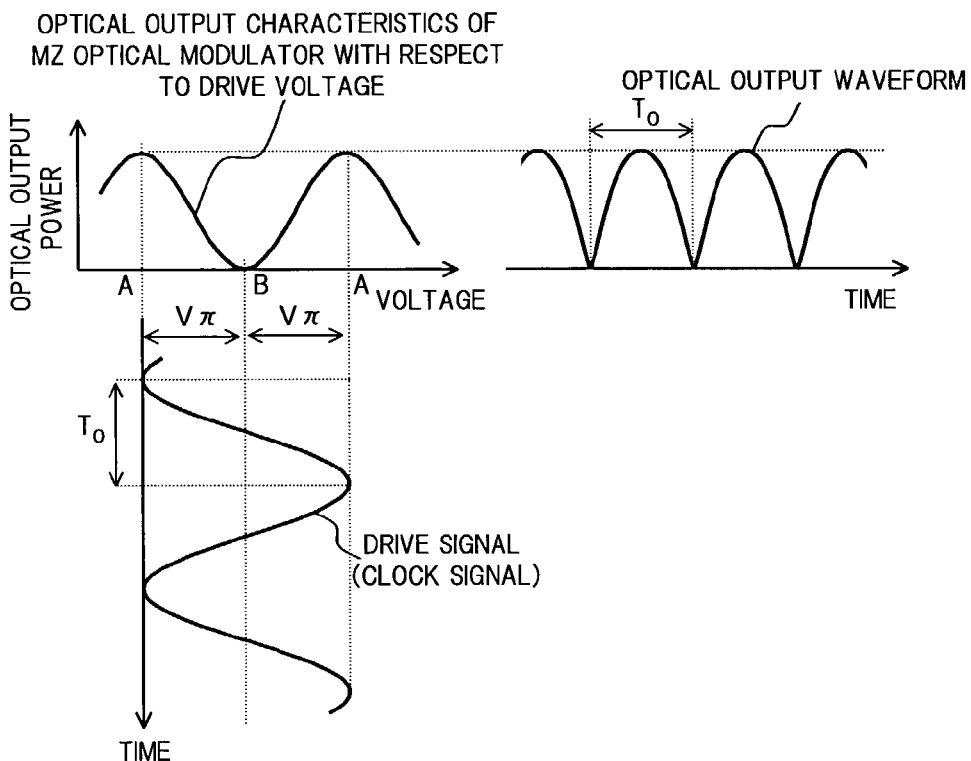
FIG. 33 is a diagram showing an example of optical output characteristics with respect to a drive signal for an MZ optical modulator on a clock modulation side.
Figure 34:
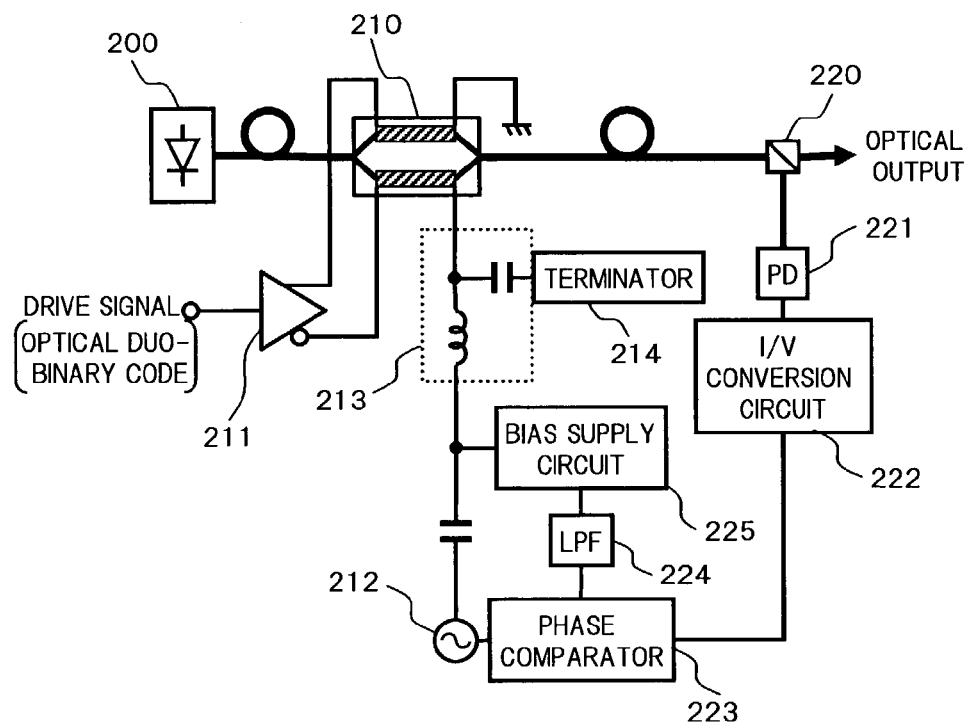
FIG. 34 is a diagram showing a configuration example of a drive control apparatus for an MZ optical modulator corresponding to a conventional optical duo binary modulation method.
Figure 35:
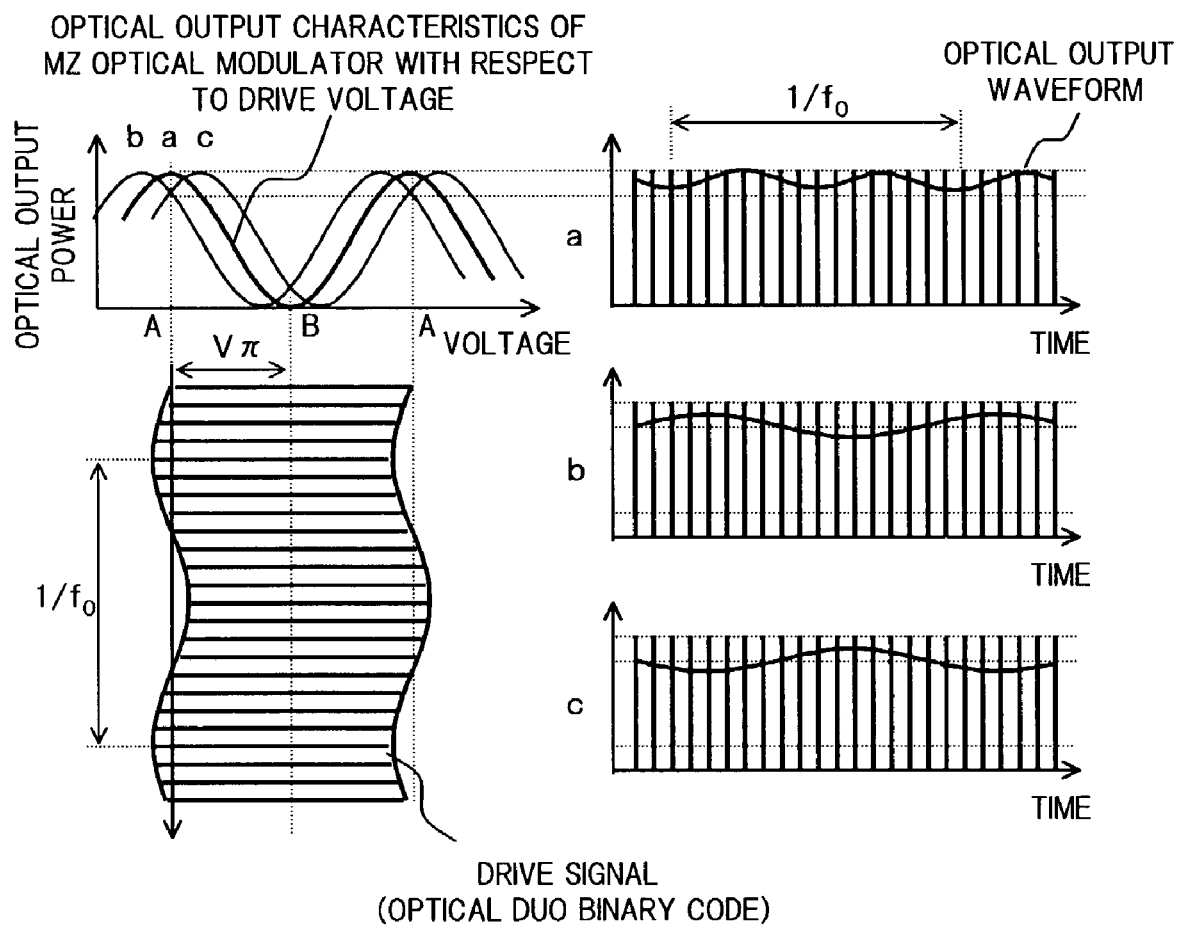
FIG. 35 is a diagram for explaining a conventional operating point control method for an MZ optical modulator corresponding to the optical duo binary modulation method.

Moreover, in the abovementioned respective embodiments, the clock signal has been amplitude adjusted by the drive circuit 11 and applied to the signal electrode of the MZ optical modulator 10. However, for example as shown in FIG. 30, the respective drive signals output from the drive circuit 11 may be respectively applied to the MZ optical modulator 10 via filters 43, for example, a low pass filter, a band pass filter or the like having transmission characteristics corresponding to the frequency $f_{CLK}$ of the clock signal. In this way, the waveform of the respective drive signals can be of an accurate sign wave.

What is claimed are:

1. A drive control apparatus for an optical modulator, in which optical output characteristics with respect to a drive voltage are changed periodically, comprising;
   a drive section that supplies, to said optical modulator, a drive signal using a clock signal with a waveform of a sine wave, whose amplitude is set corresponding to a voltage difference between two adjacent apexes of optical emission or two adjacent apexes of optical extinction in the optical output characteristics with respect to said drive voltage; and
   an operating point control section that detects power of an optical signal of which a modulated frequency corresponds to a frequency of said clock signal, output from said optical modulator and controls an operating point of said optical modulator based on an average value of the power of said optical signal.

2. A drive control apparatus for an optical modulator according to claim 1,
   wherein when the amplitude of said drive signal is set to be equal to or more than a first threshold value determined based on the optical output characteristics with respect to an operating point deviation amount of the optical modulator,
      said operating point control section controls the operating point of said optical modulator so that the average value of the power of said optical signal becomes a maximum.

3. A drive control apparatus for an optical modulator according to claim 1,
   wherein said drive section has a filter having transmission characteristics corresponding to a frequency of said clock signal, and said drive signal is supplied to said optical modulator through said filter.

4. A drive control apparatus for an optical modulator according to claim 1,
   wherein when the amplitude of said drive signal is set to be equal to or less than a second threshold value determined based on the optical output characteristics with respect to an operating point deviation amount of the optical modulator,
      said operating point control section controls the operating point of said optical modulator so that the average value of the power of said optical signal becomes a minimum.

5. A drive control apparatus for an optical modulator according to claim 1,
   wherein said operating point control section switches between a maximum value control to maximize the average value of the optical output power of said optical signal and a minimum value control to minimize the average value of the optical output power of said optical signal, according to the amplitude setting of the drive signal in said drive section.

6. A drive control apparatus for an optical modulator according to claim 1, comprising;
   an amplitude adjusting section that adjusts the amplitude of the drive signal supplied from said drive section to said optical modulator.

7. A drive control apparatus for an optical modulator according to claim 6, comprising:
   an output stability detection section that detects that the optical output from said optical modulator has been stabilized, based on an increase or decrease of the average value of the optical signal power detected by said operating point control section;
   an output drop detection section that detects whether the average value of the optical signal power detected by said operating point control section is a previously set reference value or less; and
   an amplitude determining section that determines that the amplitude of the drive signal adjusted by said amplitude adjusting section is outside of an operating point control range, based on a detection result by said output stability detection section that the optical output has been stabilized, and a detection result by said output drop detection section that the average value of the optical signal power is equal to or less than the reference value.

8. A drive control apparatus for an optical modulator according to claim 6, comprising;
   a constant amplitude control section that controls an adjustment amount in said amplitude adjusting section so that a level of the optical signal output from said optical modulator becomes constant at a previously set value, to thereby control the amplitude of the drive signal to a constant value.

9. A drive control apparatus for an optical modulator according to claim 8, comprising;
   a control switching section that switches between an operating point control of the optical modulator by said operating point control section, and an amplitude control of the drive signal by said constant amplitude control section.

10. A drive control apparatus for an optical modulator according to claim 9,
    wherein said control switching section detects that the optical output from said optical modulator has been stabilized, based on an increase or decrease of the average value of the optical signal power detected by said operating point control section, and switches between the controls according to the detection result.

11. A drive control apparatus for an optical modulator according to claim 6, wherein when a plurality of drive signals are supplied from said drive section to said optical modulator, said amplitude adjusting section is able to separately adjust each amplitude of said plurality of drive signals.

12. A drive control apparatus for an optical modulator according to claim 1,
wherein when said drive section generates a plurality of drive signals having a predetermined phase difference and supplies these to said optical modulator, there is provided a phase difference adjusting section that adjusts the phase difference between said plurality of drive signals.

13. A drive control apparatus for an optical modulator according to claim 12,
wherein said phase difference adjusting section includes a delay lock loop (DLL) circuit.

14. A drive control apparatus for an optical modulator according to claim 12, comprising:
an output stability detection section that detects that the optical output from said optical modulator has been stabilized, based on an increase or decrease of the average value of the optical signal power detected by said operating point control section;
an output drop detection section that detects whether the average value of the optical signal power detected by said operating point control section is a previously set reference value or less; and
a phase difference determining section that determines that the phase difference between drive signals is outside of an operating point control range, based on a detection result by said output stability detection section that the optical output has been stabilized, and a detection result by said output drop detection section that the average value of the optical signal power is equal to or less than the reference value.

15. A drive control apparatus for an optical modulator according to claim 12, comprising;
a phase difference control section that controls an adjustment amount in said phase difference adjustment section so that the average value of the optical signal power detected by said operating point control section becomes a maximum.

16. A drive control apparatus for an optical modulator according to claim 15, comprising;
a control switching section that switches between the operating point control of the optical modulator by said operating point control section, and the phase difference control between the plurality of drive signals by said phase difference control section.

17. A drive control apparatus for an optical modulator according to claim 16,
wherein said control switching section detects that the optical output from said optical modulator has been stabilized, based on an increase or decrease of the average value of the optical signal power detected by said operating point control section, and switches between the controls according to the detection result.

18. A drive control apparatus for an optical modulator according to claim 1,
wherein said optical modulator comprises a first optical modulation section and a second optical modulation section that is input with an optical signal output from the first modulation section,
said drive section comprises a drive circuit on a data modulation side that supplies, to said first optical modulation section, a drive signal with a waveform corresponding to a data signal, whose amplitude is set corresponding to a voltage difference between adjacent apex on the optical emission side and apex on the optical extinction side of the optical output characteristics with respect to a drive voltage of said first optical modulation section, and a drive circuit on a clock modulation side that supplies, to said second optical modulation section, a drive signal with a waveform corresponding to a clock signal which has a frequency of ½ the bit rate of said data signal, whose amplitude is set corresponding to a voltage difference between two adjacent apexes of optical emission or two adjacent apexes of optical extinction of the optical output characteristics with respect to the drive voltage of said second optical modulation section, and
said operating point control section controls at least an operating point of said second optical modulation section, based on an average value of power of an optical signal output from said second optical modulation section.

19. A drive control apparatus for an optical modulator according to claim 18,
wherein said drive circuit on the data modulation side supplies to said first optical modulation section a drive signal superimposed with a predetermined low frequency signal, and
said operating point control section detects fluctuations of an operating point of said first optical modulation section based on said low frequency signal component contained in an optical signal output from said first optical modulation section or said second optical modulation section, and controls the operating point of said second optical modulation section according to the detection result.

20. A drive control apparatus for an optical modulator according to claim 18,
wherein said drive section comprises a phase synchronizing circuit that synchronizes phases of said data signal and said clock signal.

21. A drive control apparatus for an optical modulator according to claim 18,
wherein said drive circuit on the data modulation side supplies to said first optical modulation section a drive signal of a waveform corresponding to a data signal of an NRZ (non return to zero) modulation method so that said second optical modulation section outputs an optical signal of a CS-RZ (carrier suppressed return to zero) modulation method.

22. A drive control apparatus for an optical modulator according to claim 1,
wherein said optical modulator is a Mach-Zehnder optical modulator.

23. A drive control method for an optical modulator, in which optical output characteristics with respect to a drive voltage are changed periodically,
wherein a drive signal using a clock signal with a waveform of a sine wave, whose amplitude is set corresponding to a voltage difference between two adjacent apexes of optical emission or two adjacent apexes of optical extinction in the optical output characteristics with respect to said drive voltage, is supplied to said optical modulator, and power of an optical signal of which a modulated frequency corresponds to a frequency of said clock signal, output from said optical modulator is detected and an operating point of said optical modulator is controlled based on an average value of the power of said optical signal.

24. A drive control method for an optical modulator according to claim 23, wherein when the amplitude of said drive signal is set to be equal to or more than a first threshold value determined based on the optical output characteristics with respect to an operating point deviation amount of the optical modulator, the operating point of said optical modulator is controlled so that the average value of the power of said optical signal becomes a maximum.

25. A drive control method for an optical modulator according to claim 23, wherein when the amplitude of said drive signal is set to be equal to or less than a second threshold value determined based on the optical output characteristics with respect to an operating point deviation amount of the optical modulator, the operating point of said optical modulator is controlled so that the average value of the power of said optical signal becomes a minimum.

26. A method of operating an optical modulator which outputs light whose characteristics with respect to a drive voltage are changed periodically, comprising:

providing an input signal to the optical modulator using a clock signal with a waveform of a sine wave, whose amplitude is set corresponding to a voltage difference between two adjacent apexes of optical emission or two adjacent apexes of optical extinction of an output light characteristic;

detecting a power of an output light whose modulated frequency corresponds to a frequency of the clock signal; and controlling an operating point of the optical modulator based on an average value of the power of the output light.

* * * * *

UNITED STATES PATENT AND TRADEMARK OFFICE
CERTIFICATE OF CORRECTION

| | |
|---|---|
| PATENT NO. | : 7,200,343 B2 |
| APPLICATION NO. | : 10/284401 |
| DATED | : April 3, 2007 |
| INVENTOR(S) | : Tadashi Ikeuchi |

It is certified that error appears in the above-identified patent and that said Letters Patent is hereby corrected as shown below:

Column 21, Line 33, change "comprising;" to --comprising:--.

Signed and Sealed this

Third Day of July, 2007

JON W. DUDAS
*Director of the United States Patent and Trademark Office*